(12) United States Patent
Suto et al.

(10) Patent No.: US 10,401,773 B2
(45) Date of Patent: Sep. 3, 2019

(54) SHEET TRANSPORT APPARATUS, AUTOMATIC DOCUMENT FEEDER, AND IMAGE FORMING APPARATUS

(71) Applicant: Sharp Kabushiki Kaisha, Osaka (JP)

(72) Inventors: Yasuhiro Suto, Osaka (JP); Yasumasa Morimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/038,838

(22) Filed: Jul. 18, 2018

(65) Prior Publication Data

US 2018/0356760 A1    Dec. 13, 2018

Related U.S. Application Data

(63) Continuation of application No. 15/097,985, filed on Apr. 13, 2016, now Pat. No. 10,048,632.

(30) Foreign Application Priority Data

Apr. 15, 2015  (JP) .................................. 2015-083607
Mar. 8, 2016   (JP) .................................. 2016-044689

(51) Int. Cl.
*G03G 21/16*    (2006.01)
*G03G 15/00*    (2006.01)
(Continued)

(52) U.S. Cl.
CPC ........... *G03G 15/602* (2013.01); *B65H 5/062* (2013.01); *B65H 5/38* (2013.01); *G03G 15/6529* (2013.01);
(Continued)

(58) Field of Classification Search
CPC .......... G03G 21/1623; G03G 21/1628; G03G 21/1633; G03G 21/1638; G03G 15/60;
(Continued)

(56) References Cited

U.S. PATENT DOCUMENTS

2001/0017438 A1   8/2001   Takamtsu
2002/0030321 A1   3/2002   Sugiyama
2014/0293359 A1  10/2014   Niikawa

FOREIGN PATENT DOCUMENTS

JP    11-106086    4/1999
JP    2010-054881  3/2010

OTHER PUBLICATIONS

Allowable claims from parent U.S. Appl. No. 15/097,985, filed Apr. 13, 2016.

*Primary Examiner* — Thomas S Giampaolo, II
(74) *Attorney, Agent, or Firm* — Renner, Otto, Boisselle & Sklar, LLP

(57) ABSTRACT

A sheet transport apparatus is equipped with a sheet transport guide section for guiding a sheet to be transported. The sheet transport guide section includes a first transport guide member swingable about a first axis, and a second transport guide member swingable about a second axis, the second transport guide member forming a sheet transport path between the second transport guide member and the first transport guide member. The second transport guide member is arranged at a first position when the first transport guide member is closed, at a second position where the second transport guide member is opened from the first position when the first transport guide member is opened, or at a third position where the second transport guide member is opened from the second position.

14 Claims, 22 Drawing Sheets

(51) Int. Cl.
*B65H 5/06* (2006.01)
*H04N 1/00* (2006.01)
*B65H 5/38* (2006.01)

(52) U.S. Cl.
CPC ......... *H04N 1/00* (2013.01); *B65H 2402/441* (2013.01); *B65H 2404/611* (2013.01); *B65H 2601/11* (2013.01); *B65H 2601/321* (2013.01)

(58) Field of Classification Search
CPC .. G03G 15/65; G03G 15/602; G03G 15/6529; G03G 2221/1672; G03G 2221/1675; G03G 2221/1687; G03G 2215/00172; G03G 2215/00341; G03G 2215/00675
See application file for complete search history.

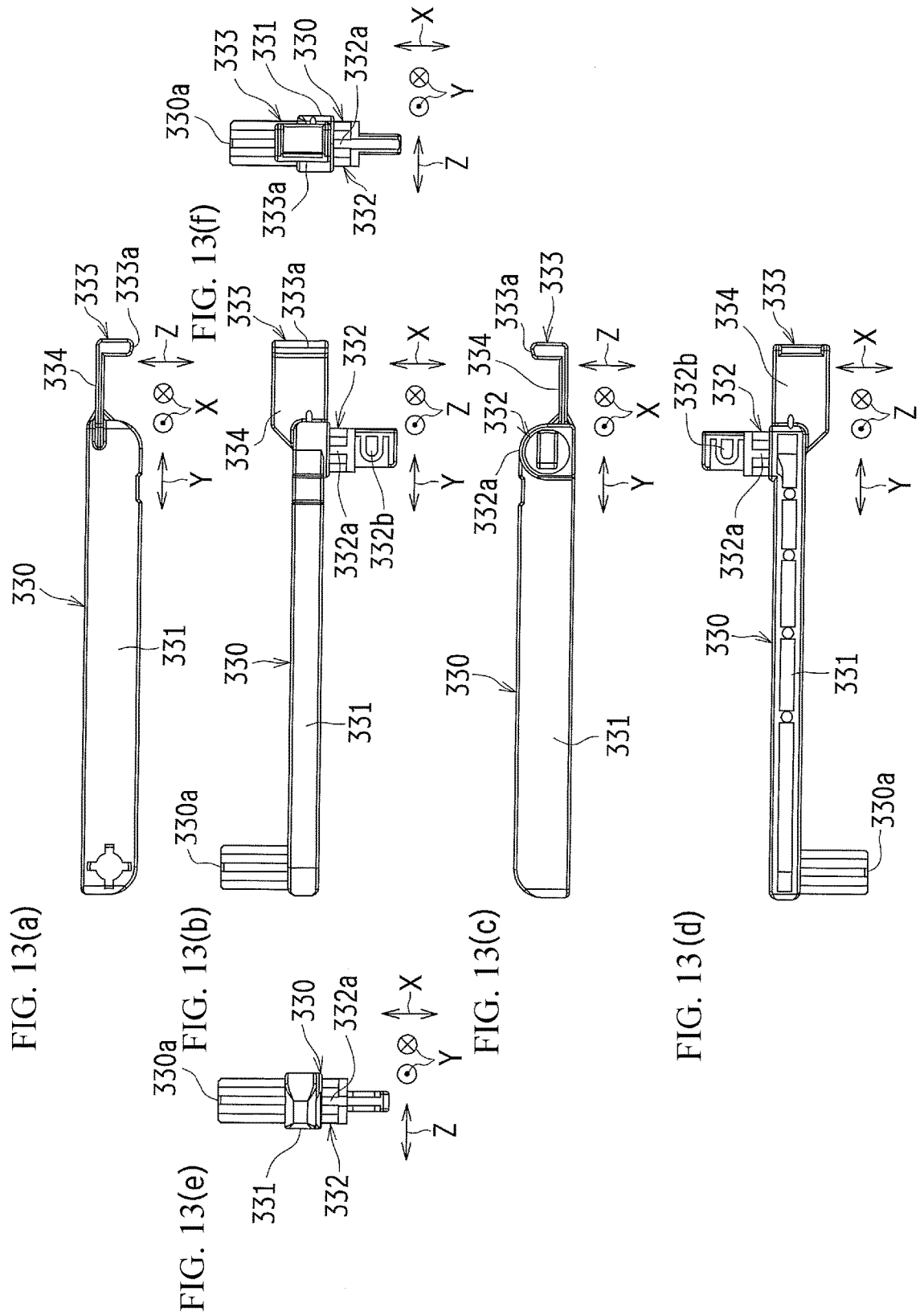

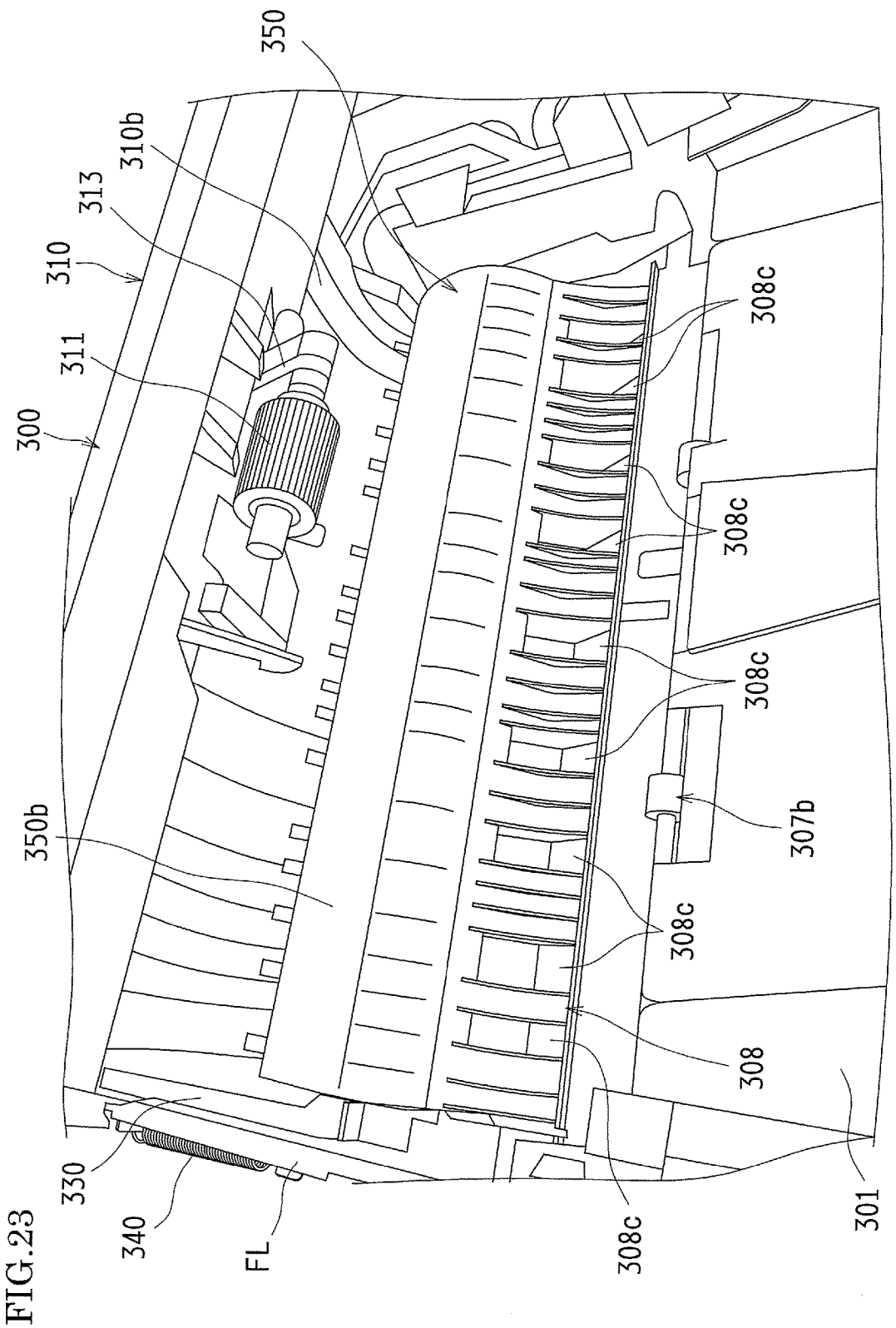

SHEET TRANSPORT APPARATUS, AUTOMATIC DOCUMENT FEEDER, AND IMAGE FORMING APPARATUS

CROSS-REFERENCE TO RELATED APPLICATIONS

The present application is a continuation application under 35 U.S.C. § 120 of pending prior U.S. application Ser. No. 15/097,985 filed on Apr. 13, 2016, and claims priority under 35 U.S.C. § 119(a) to Japanese Patent Application No. 2015-083607 filed on Apr. 15, 2015, and Japanese Patent Application No. 2016-044689 filed on Mar. 8, 2016. The contents of these applications are incorporated herein by reference in their entirety.

BACKGROUND OF THE INVENTION

Field of the Invention

The present invention relates to a sheet transport apparatus, an automatic document feeder (ADF), and an image forming apparatus such as a copying machine, a multifunction printer (MFP) or the like.

Description of the Related Art

Generally, a sheet transport apparatus is equipped with a sheet transport guide section for guiding a sheet to be transported.

As such, a conventional sheet transport apparatus is equipped with a sheet transport guide section including a first transport guide member and a second transport guide member. The first transport guide member is swingable about a first axis extending in width directions of a sheet, the width directions being orthogonal or substantially orthogonal to a sheet transport direction. The second transport guide member forms a sheet transport path for allowing passage of a sheet between the second transport guide member and the first transport guide member. The second transport guide member is fixed on a main body of the sheet transport apparatus by a fixing member such as a screw.

In this sheet transport apparatus in which the second transport guide member is fixed on the main body of the sheet transport apparatus, when a sheet is jammed at the second transport guide member on a far side of the first transport guide member (namely, when a paper jam occurs), it is difficult to remove the sheet jammed at the second transport guide member on the far side of the first transport guide member (namely, a paper jam clearing operation is troublesome).

In this regard, a document transport apparatus disclosed in Patent Literature 1 is provided with an upper frame (a first transport guide member) and an intermediate frame (a second transport guide member) which are supported by a single common shaft in an openable and closable manner, and is also provided with a latch part for latching these frames together.

[Patent Literature 1] JP 11-106086 A

SUMMARY OF THE INVENTION

Problems to be Solved by the Invention

However, in the document transport apparatus disclosed in Patent Literature 1, the upper frame (the first transport guide member) and the intermediate frame (the second transport guide member) are latched together at the latch part. This structure prevents free opening/closing movements of the intermediate frame (the second transport guide member) relative to the upper frame (the first transport guide member), and results in poor work efficiency in the paper jam clearing operation for a document (a sheet).

In view of the situation, the present invention aims to provide a sheet transport apparatus, an automatic document feeder (ADF), and an image forming apparatus, in which a second transport guide member can be opened and closed freely relative to a first transport guide member, thereby facilitating a paper jam clearing operation for a sheet and enhancing the work efficiency in a paper jam clearing operation.

In order to solve the above problem, the present invention provides sheet a transport apparatus according to each of First and Second Embodiments, an automatic document feeder, and an image forming apparatus, as described below.

(1) Sheet Transport Apparatus (1-1) Sheet Transport Apparatus According to First Embodiment A sheet transport apparatus according to First Embodiment of the present invention is a sheet transport apparatus equipped with a sheet transport guide section for guiding a sheet to be transported, and has the following characteristics. The sheet transport guide section includes a first transport guide member which is swingable about a first axis extending in a width direction of the sheet, the width direction being orthogonal or substantially orthogonal to a sheet transport direction, and a second transport guide member which is swingable about a second axis extending in the width direction and which forms a sheet transport path for allowing passage of the sheet between the second transport guide member and the first transport guide member. The second transport guide member is arranged at a first position when the first transport guide member is closed, at a second position where the second transport guide member is opened from the first position when the first transport guide member is opened, or at a third position where the second transport guide member is opened from the second position.

(1-2) Sheet Transport Apparatus According to Second Embodiment

A sheet transport apparatus according to Second Embodiment of the present invention is a sheet transport apparatus equipped with a sheet transport guide section for guiding a sheet to be transported, and has the following characteristics. The sheet transport guide section includes a first transport guide member which is swingable about a first axis extending in a width direction of the sheet, the width direction being orthogonal or substantially orthogonal to a sheet transport direction, a second transport guide member which is swingable about a second axis extending in the width direction and which forms a sheet transport path for allowing passage of the sheet between the second transport guide member and the first transport guide member, and a swingable member which is swingable about a third axis extending in the width direction, relative to the first transport guide member, at a different position from the first axis of the first transport guide member. When the first transport guide member is opened or closed, the first transport guide member moves in an opening or closing direction about the first axis, followed by a swinging movement of the swingable member about the third axis, and the second transport guide member is caused to swing about the second axis in synchronization with the swinging movement of the swingable member.

(2) Automatic Document Feeder

An automatic document feeder according to the present invention is equipped with the sheet transport apparatus according to First or Second Embodiment of the present invention as described above.

(3) Image Forming Apparatus

An image forming apparatus according to the present invention is equipped with the automatic document feeder according to the present invention as described above, In an example of Second Embodiment described above, even when the second transport guide member is opened or closed, the first transport guide member and the swingable member are arranged not to swing in synchronization with an opening or closing movement of the second transport guide member about the second swing axis.

In another example of Second Embodiment described above, the swingable member includes a reciprocating part which makes a reciprocating movement in reciprocating directions which are orthogonal or substantially orthogonal to the width direction when the swingable member swings about the third axis in synchronization with an opening movement of the first transport guide member, and also includes an abutting part provided on the reciprocating part and arranged to abut on the second transport guide member. In addition, the second transport guide member includes a sliding contact guide part which is arranged to come into sliding contact with the abutting part of the swingable member when the reciprocating part of the swingable member moves, and thereby to cause the second transport guide member to be lifted about the second axis.

In yet another example of Second Embodiment described above, the swingable member further includes a supporting part, and the abutting part is supported by the reciprocating part by means of the supporting part.

In still another example of Second Embodiment described above, the supporting part is flexible.

In a further example of Second Embodiment described above, the sheet transport apparatus further includes a frame provided in a main body of the sheet transport apparatus. The frame is provided with a guide part for guiding the reciprocating part of the swingable member in the reciprocating directions. The reciprocating part of the swingable member is provided with an engagement portion to be engaged with the guide part of the frame.

In a yet further example of Second Embodiment described above, the sheet transport apparatus further includes a biasing member which is provided between the reciprocating part of the swingable member and the frame, and which biases, by means of the swingable member, the first transport guide member in an open direction about the first axis.

In a still further example of Second Embodiment described above, the second transport guide member is arranged at a first position when the first transport guide member is closed, at a second position where the second transport guide member is opened from the first position when the first transport guide member is opened, or at a third position where the second transport guide member is opened from the second position.

In an example of First and Second Embodiments described above, the second transport guide member stops at the third position.

In another example of First and Second Embodiments described above, a difference between a degree of opening of the second transport guide member at the second position and a degree of opening of the second transport guide member at the third position is greater than a difference between a degree of opening of the second transport guide member at the second position and a degree of opening of the second transport guide member at the first position.

In yet another example of First and Second Embodiments described above, the sheet transport apparatus further includes a third transport guide member for guiding the sheet to be transported between the third transport guide member and the second transport guide member. An opening between the second transport guide member at the third position and the third transport guide member is wider than an opening between the second transport guide member at the third position and the first transport guide member in an open state.

In still another example of First and Second Embodiments described above, when the second transport guide member is opened, the second transport guide member stops at the third position where a center of gravity of the second transport guide member is on a closed side of the second transport guide member relative to an imaginary vertical line which passes through the second axis.

In a further example of First and Second Embodiments described above, when the second transport guide member is opened, the second transport guide member is limited by the first transport guide member and stops at the third position where a center of gravity of the second transport guide member is on an open side of the second transport guide member relative to an imaginary vertical line which passes through the second axis.

In a yet further example of First and Second Embodiments described above, when the first transport guide member is opened, the first transport guide member stops at a first position thereof where a center of gravity of the first transport guide member is on a closed side of the first transport guide member relative to an imaginary vertical line which passes through the first axis.

In a still further example of First and Second Embodiments described above, when the first transport guide member is opened, the first transport guide member stops at a second position thereof where a center of gravity of the first transport guide member is on an open side of the first transport guide member relative to an imaginary vertical line which passes through the first axis.

In a different example of First and Second Embodiments described above, a recess is provided at an end of the second transport guide member opposite to a swing fulcrum of the second transport guide member.

In a yet different example of First and Second Embodiments described above, a recess is provided in the second transport guide member, on an operation side relative to a center in the width direction.

In a further different example of First and Second Embodiments described above, the sheet transport apparatus further includes an interlock detection switch for prohibiting an action of the apparatus, and an activating part for activating the interlock detection switch. The interlock detection switch is provided in either of the first transport guide member or the second transport guide member, and the activating part is provided in the other transport guide member. The interlock detection switch and the activating part are positioned such that, in a state where the first transport guide member is closed, the interlock detection switch is turned on by the activating part. The first axis in the first transport guide member and the second axis in the second transport guide member are provided at different positions from each other.

According to the present invention, the second transport guide member can be opened and closed freely relative to the first transport guide member, thereby facilitating a paper jam clearing operation for a sheet and enhancing the work efficiency in the paper jam clearing operation.

BRIEF DESCRIPTION OF THE DRAWINGS

FIGS. 13(a)-13(f) represent a general configuration of the swingable member in the automatic document feeder, respectively being a back view, a plan view, a front view, a bottom view, a left side view, and a right side view of the swingable member.

FIG. 23 is a top, side perspective view of a part around a branching member, for explaining through-windows provided in the branching member, with the first transport guide member fully open and the second transport guide member removed.

DESCRIPTION OF THE EMBODIMENTS

Hereinafter, embodiments according to the present invention are described with reference to the drawings.

Image Forming Apparatus

Figure 1:
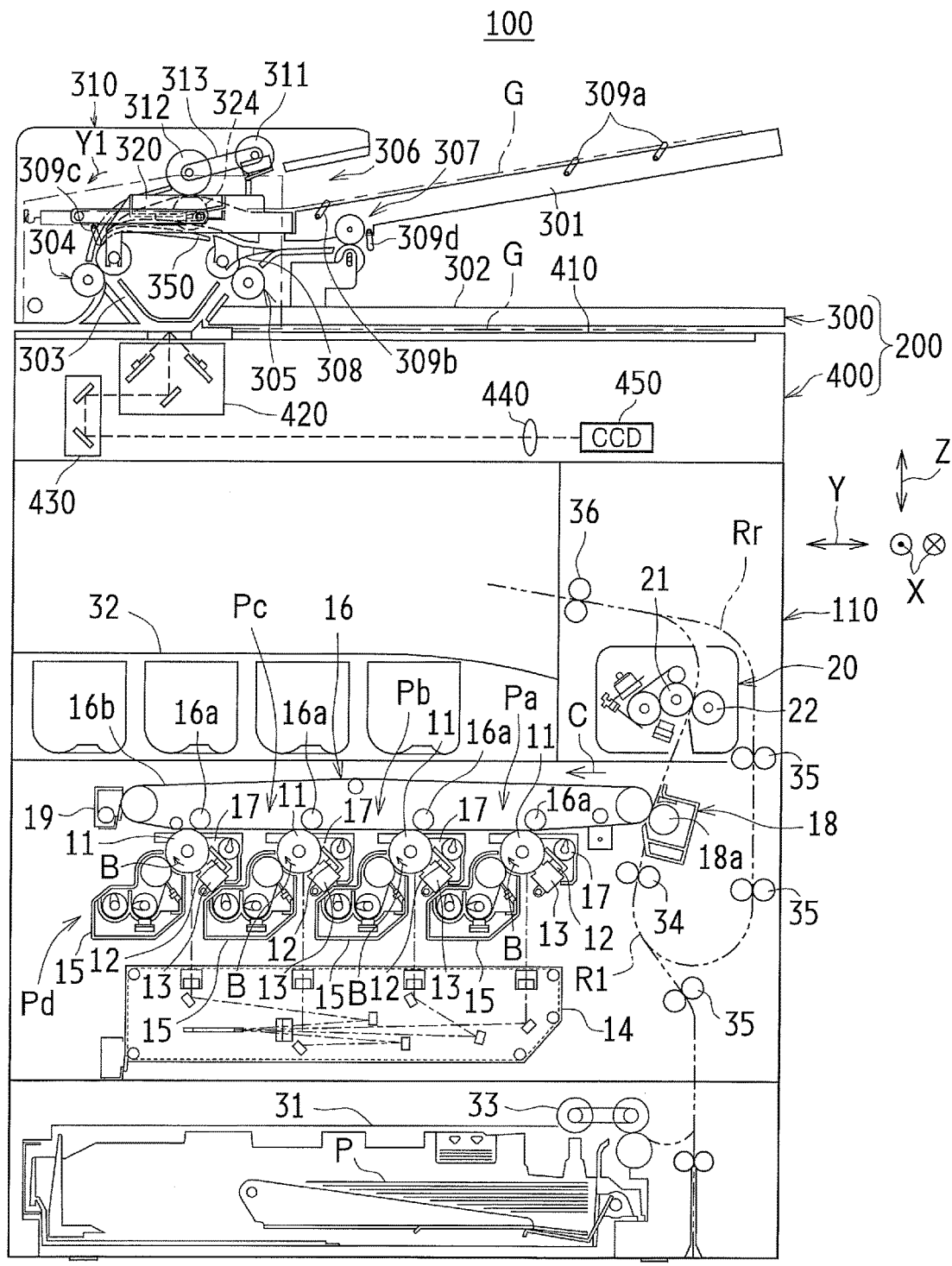
FIG. 1 is a front view showing a schematic configuration of an image forming apparatus according to the embodiments of the present invention.

FIG. 1 is a front view showing a schematic configuration of an image forming apparatus 100 according to the embodiments of the present invention.

As shown in FIG. 1, the image forming apparatus 100 includes an image reading apparatus 200 and an image forming apparatus main body 110. Based on image data read by the image reading apparatus 200 or sent from an external device, the image forming apparatus main body 110 forms a monochrome image or a color image on a recording sheet P such as recording paper.

The image reading apparatus 200 includes an automatic document feeder (ADF) 300 and a document reader 400. The document reader 400 scans a document G (an example of the sheet) transported by the automatic document feeder 300 or a document G set on a platen 410. The document reader 400 then outputs a scanned image of the document G as image data.

The image forming apparatus 100 is an electrophotographic image forming apparatus, and is a so-called tandem-method color image forming apparatus in which a plurality of image carriers (specifically, photoreceptors) are arranged side by side in a predetermined direction (in this example, in crosswise directions Y, i.e. left-right directions in the drawings). In this example, the image forming apparatus 100 is a color multifunction printer capable of forming a full-color image and operated by the intermediate transfer method. The image forming apparatus 100 is not limited to a tandem-method color image forming apparatus as used in the present embodiments, and may be a color image forming apparatus operated by other methods. Additionally, the image forming apparatus 100 is not limited to a color image forming apparatus and may be a monochrome image forming apparatus.

The image forming apparatus main body 110 includes photoreceptors 11 (specifically, photosensitive drums), static eliminators 12, chargers 13 as charging units, an exposure unit 14, developing units 15, an intermediate transfer belt unit 16 as a primary transfer unit, drum cleaning units 17, a secondary transfer unit 18, a belt cleaning unit 19, a fixing unit 20, a transport path R1, a paper feed tray 31, and a discharge tray 32.

In this image forming apparatus main body 110, surfaces of the photoreceptors 11 are electrostatically charged by the chargers 13, and the electrostatically charged areas are exposed to form electrostatic latent images by the exposure unit 14. The electrostatic latent images are visualized (developed) as toner images by the developing units 15. The visualized toner images are electrostatically transferred on the intermediate transfer belt unit 16. The toner images transferred on the intermediate transfer belt unit 16 are transferred onto the recording sheet P by the secondary transfer unit 18, and fixed thereon by the fixing unit 20.

A color image is composed of toner images in black (K), cyan (C), magenta (M), and yellow (Y) overlapped on each other. For this purpose, a set of the photoreceptor 11, the static eliminator 12, the charger 13, the developing unit 15, and the drum cleaning unit 17 is required for each color. In this example, four such sets are provided to form toner images in four colors corresponding to black, cyan, magenta and yellow, and constitute four imaging stations Pa, Pb, Pc, and Pd, respectively.

In the imaging stations Pa, Pb, Pc, Pd, following operations are conducted.

The static eliminators 12-12 irradiate surfaces of the photoreceptors 11-11 which are driven to rotate in a rotation direction B (clockwise in the example shown in FIG. 1), thereby to remove (neutralize) electric charges (residual charges) on the surfaces of the photoreceptors 11-11.

The chargers 13-13 charge the surfaces of the photoreceptors 11-11 which are neutralized by the static eliminators 12-12, uniformly at a predetermined potential.

The exposure unit 14 exposes the surfaces of the photoreceptors 11-11 which are uniformly charged by the chargers 13-13, and forms electrostatic latent images on the surfaces of the photoreceptors 11-11.

The developing units 15-15 develop the electrostatic latent images formed on the surfaces of the photoreceptors 11-11 by the exposure unit 14, and form single-color toner images in corresponding colors on the surfaces of the photoreceptors 11-11.

In the imaging stations Pa, Pb, Pc, Pd, toner images in corresponding colors are formed on the surfaces of the photoreceptors 11-11 by a series of above-mentioned operations.

The intermediate transfer belt unit 16 has primary transfer rollers 16a and an intermediate transfer belt 16b. To form four single-color toner images, four primary transfer rollers 16a are provided on an inner side of the intermediate transfer belt 16b. By the primary transfer rollers 16a-16a, the single-color toner images formed on the surfaces of the photoreceptors 11-11 are transferred on the intermediate transfer belt 16b which circles in the direction of Arrow C.

The drum cleaning units 17-17 remove and collect residual toner which was not transferred onto the intermediate transfer belt 16b and which remains on the surfaces of the photoreceptors 11-11.

The secondary transfer unit 18 has a secondary transfer roller 18a, which forms a nip region between the secondary transfer roller 18a and the intermediate transfer belt 16b. The secondary transfer roller 18a guides a recording sheet P conveyed in the transport path R1 into the nip region. While the recording sheet P passes the nip region, the toner images (for example, color toner images) formed on the surface of the intermediate transfer belt 16b are transferred by the secondary transfer roller 18a onto the recording sheet P.

The belt cleaning unit 19 removes and collects residual toner which was not transferred onto the recording sheet P and which remains on the surface of the intermediate transfer belt 16b.

The fixing unit 20 has a heating roller 21 and a pressure roller 22. While the recording sheet P on which the toner images are transferred passes between the heating roller 21 and the pressure roller 22, the heating roller 21 and the pressure roller 22 apply heat and pressure to the recording sheet P, thereby fixing the toner images on the recording sheet P.

A paper feed tray 31 is designed to accommodate recording sheets P. Pick-up rollers 33 are provided on a recording sheet P supply side of the paper feed tray 31. The pick-up rollers 33 draw a recording sheet P from the paper feed tray 31 and guide the recording sheet P into the transport path R1.

The recording sheet P is conveyed in the transport path R1, via the secondary transfer unit 18 and the fixing unit 20, to discharge rollers 36. The discharge rollers 36 are provided on a recording sheet P discharging side in the transport path R1. The discharge rollers 36 discharge the recording sheet P transported in the transport path R1 to a discharge tray 32. A pair of registration rollers 34 and pairs of transport rollers 35-35 are provided in the transport path R1. The pair of registration rollers 34 temporarily stops the recording sheet P so as to align a leading edge of the recording sheet P, and thereafter feeds the recording sheet P in synchronization with the timing of transferring the toner images at the nip region between the intermediate transfer belt 16b and the secondary transfer roller 18a. The pairs of transport rollers 35-35 assist the transport of the recording sheet P.

The transport path R1 includes a reverse path Rr. In the case where the image forming apparatus main body 110 forms an image not only on a front side of the recording sheet P but also on a back side thereof, the recording sheet P is transported backward from the discharge rollers 36 to the reverse path Rr, thereby reversing the recording sheet P from one side to the other, and guiding the reversed recording sheet P to the pair of registration rollers 34 again. Then, toner images are fixed on the back side of the recording sheet P in the same manner as on the front side, and the recording sheet P is discharged to the discharge tray 32.

In FIG. 1, the symbol X represents width directions (depth directions); the symbol Y represents crosswise directions (left-right directions) orthogonal to the width directions X; and the symbol Z represents height directions (specifically, vertical directions). Other members illustrated in FIG. 1 with reference numerals/symbols but not described above will be described later.

[Overall Configuration of the Image Reading Apparatus]

Figure 2:
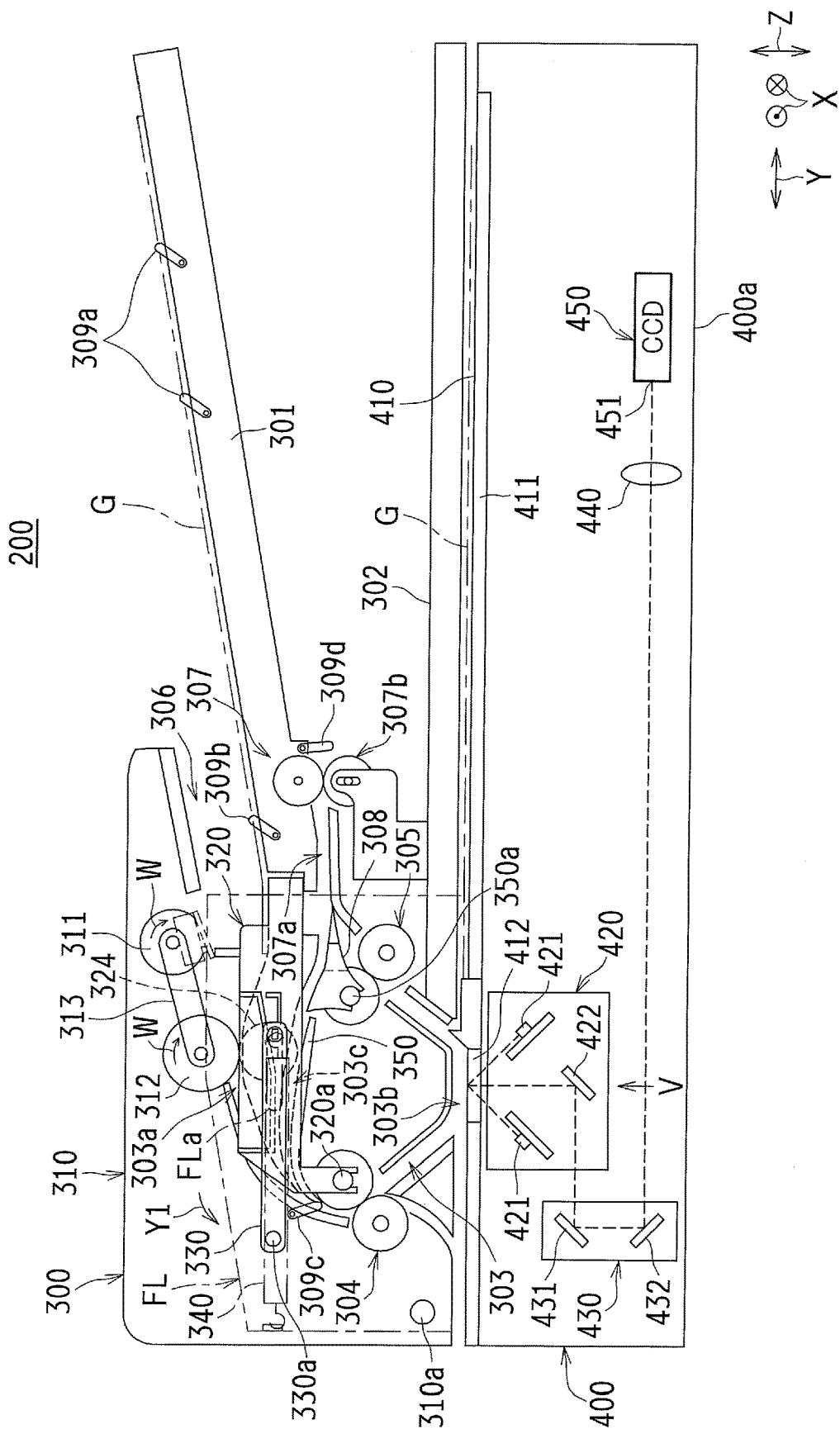
FIG. 2 is a schematic front view schematically showing a general configuration of an image reading apparatus shown in FIG. 1, with a first transport guide member closed and a second transport guide member at a first position.

FIG. 2 is a schematic front view schematically showing a general configuration of the image reading apparatus 200 shown in FIG. 1, with a first transport guide member 310 closed and a second transport guide member 320 at a first position.

The image reading apparatus 200 shown in FIGS. 1 and 2 is an image reading apparatus having a reduction optical system. The image reading apparatus 200 is configured to scan an image of a fixed document G in a stationary original exposure mode and also to scan an image of a moving document G in a moving original exposure mode. In other words, the image reading apparatus 200 includes an arrangement for scanning a fixed document and an arrangement for scanning a moving document.

To scan an image in a stationary original exposure mode, a document G is set on a platen glass 411 (see FIG. 2) which constitutes the platen 410, and is irradiated through the platen glass 411 by a light source unit 420 which serves as an irradiation device. While the light source unit 420 is moving from one side to the other in sub-scanning directions (the crosswise directions Y) and irradiating the stationary document G, the light source unit 420 receives reflected light from the irradiated document G in main scanning directions (the width directions X) which are orthogonal to the sub-scanning directions.

To scan an image in a moving original exposure mode, a document G is transported in a transport direction Y1 by the automatic document feeder 300 over a document reading glass 412 (see FIG. 2) which constitutes the platen 410. While the light source unit 420 stays at a fixed position V (see FIG. 2) in the document reader 400 and irradiates the moving document G through the document reading glass 412, the light source unit 420 receives reflected light from the irradiated document G in the main scanning directions (the width directions X).

To be more specific, the document reader 400 includes not only the platen glass 411, the document reading glass 412 and the light source unit 420, but also an optical system driving unit (not shown) for moving the light source unit 420, a mirror unit 430, a condensing lens 440, and a photoelectric transducer (a CCD in this example) 450. These members are accommodated in a frame body 400a (see FIG. 2). As shown in FIG. 2, the light source unit 420 contains light sources 421 for emitting light to a document G, and a first mirror 422 for guiding reflected light from the document G to the mirror unit 430.

The platen glass 411 and the document reading glass 412, each made of a transparent glass plate, have their ends in the main scanning directions (the width directions X) held on the frame body 400a. The automatic document feeder 300 can be opened and closed relative to the document reader 400 about an axis extending in the sub-scanning directions (crosswise directions Y) (for example, axially held by a hinge). A bottom face of the automatic document feeder 300 serves as a document hold-down member for holding down the document G placed on the platen glass 411 of the document reader 400.

The mirror unit 430 contains, as shown in FIG. 2, a second mirror 431, a third mirror 432, and a support member (not shown). The support member in the mirror unit 430 holds the second mirror 431 such that the second mirror 431 can receive light from the first mirror 422 in the light source unit 420 and reflect the light to the third mirror 432. The support member in the mirror unit 430 also holds the third mirror 432 such that the third mirror 432 can receive the light from the second mirror 431 and reflect the light to the condensing lens 440. The condensing lens 440 condenses the light from the third mirror 432 in the mirror unit 430 into a light-receiving surface 451 of the photoelectric transducer 450. The photoelectric transducer 450 converts the light from the condensing lens 440 (document image light) into an electric signal as image data.

The optical system driving unit in the document reader 400 is configured to move the light source unit 420 in the sub-scanning directions (the crosswise directions Y) at a constant speed, and to move the mirror unit 430 also in the sub-scanning directions (the crosswise directions Y) at a speed half as fast as the speed of the light source unit 420.

The sheet transport apparatus according to the present embodiments is applied to the automatic document feeder 300. The automatic document feeder 300 includes a document tray 301 for holding a document G to be transported, a discharge tray 302 provided under the document tray 301, a main transport path 303 connecting these trays, a pair of upstream transport rollers 304, and a pair of downstream transport rollers 305.

The pair of upstream transport rollers 304 is provided upstream of the document reading glass 412 in the transport direction Y1 of the document G, and transports the document G from an upstream side to the document reading glass 412. The pair of downstream transport rollers 305 is provided downstream of the document reading glass 412 in the transport direction Y1, and transports the document G to a downstream side from the document reading glass 412. Namely, the pair of upstream transport rollers 304, the document reading glass 412, and the pair of downstream transport rollers 305 are arranged in this order in the main transport path 303. The document reading glass 412 is arranged in a substantially horizontal manner so as to form a part of a guide wall of a reverse sheet transport path 303b (see FIG. 2) which constitutes the main transport path 303.

Other members illustrated in FIG. 2 with reference numerals/symbols but not described above will be described later.

Figure 3:
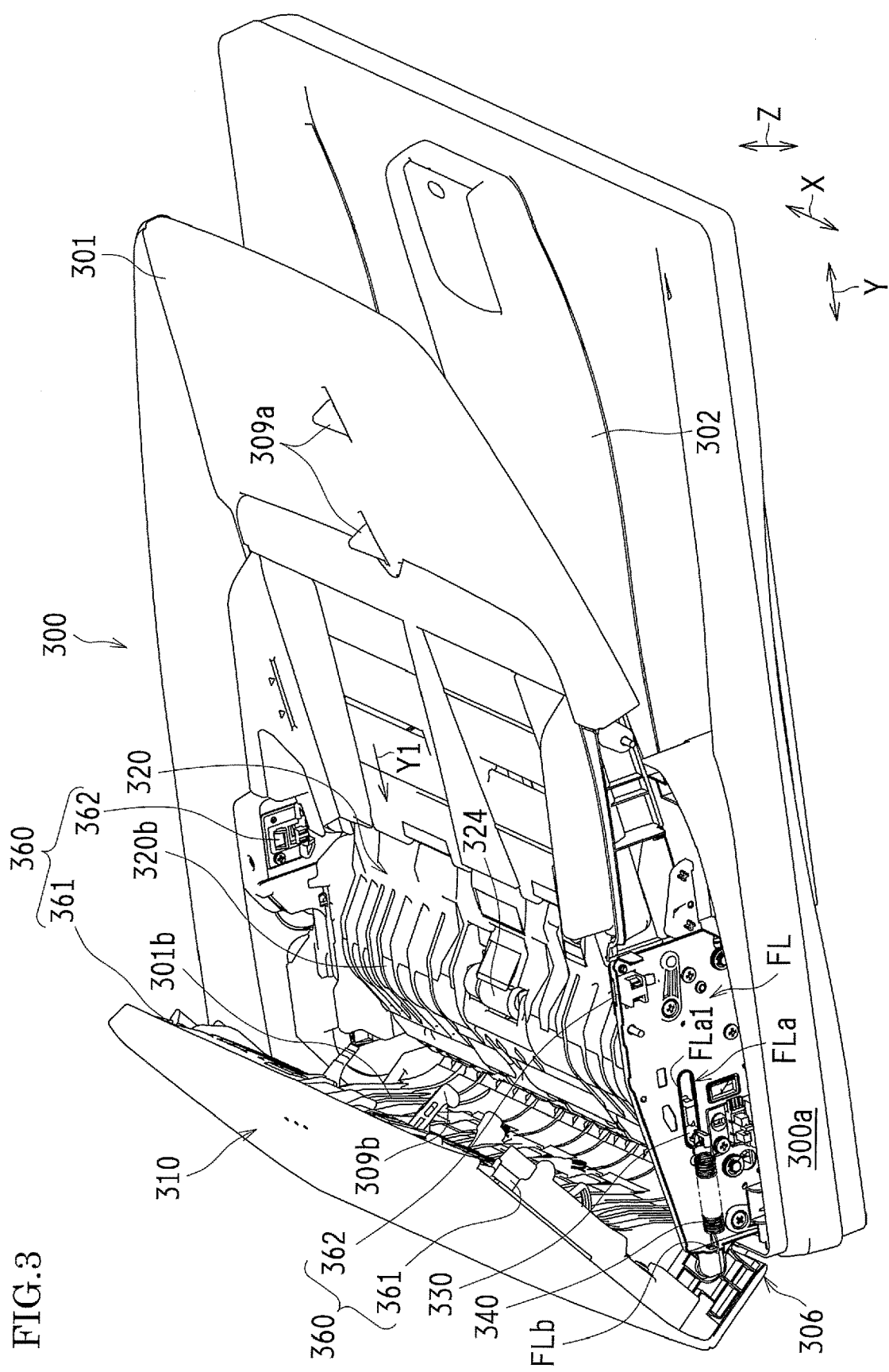
FIG. 3 is a perspective view of an example of an automatic document feeder in the image reading apparatus shown in FIG. 2, with the first transport guide member open and the second transport guide member at a second position.

FIG. 3 is a perspective view of an example of the automatic document feeder 300 in the image reading apparatus 200 shown in FIG. 2, with the first transport guide member 310 open and the second transport guide member 320 at a second position. In FIG. 3, the automatic document feeder is illustrated with a front cover removed.

Figure 4:
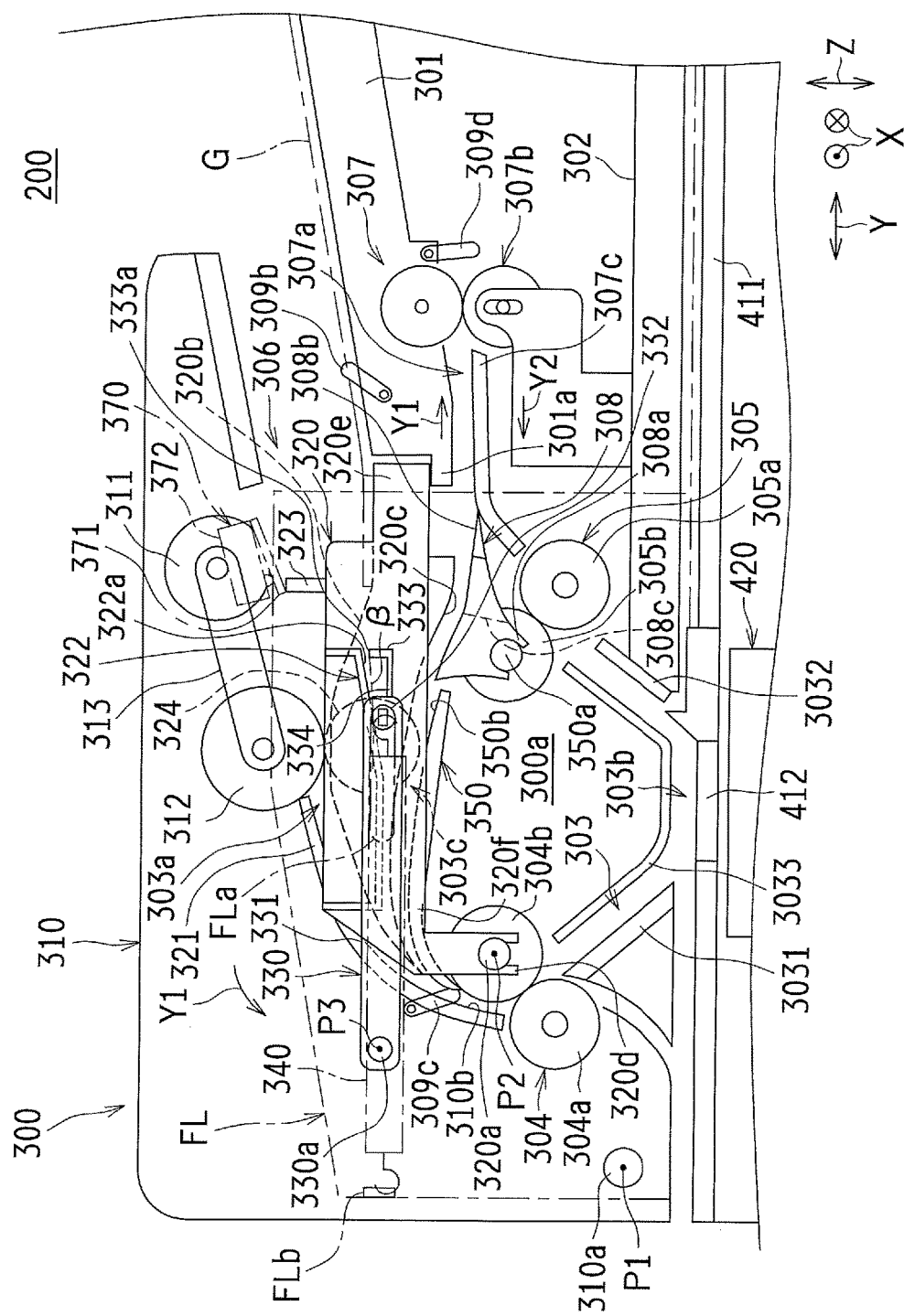
FIG. 4 is a schematic front view of an example of the automatic document feeder in the image reading apparatus shown in FIG. 2, showing a sheet transport part on an enlarged scale.
Figure 5:
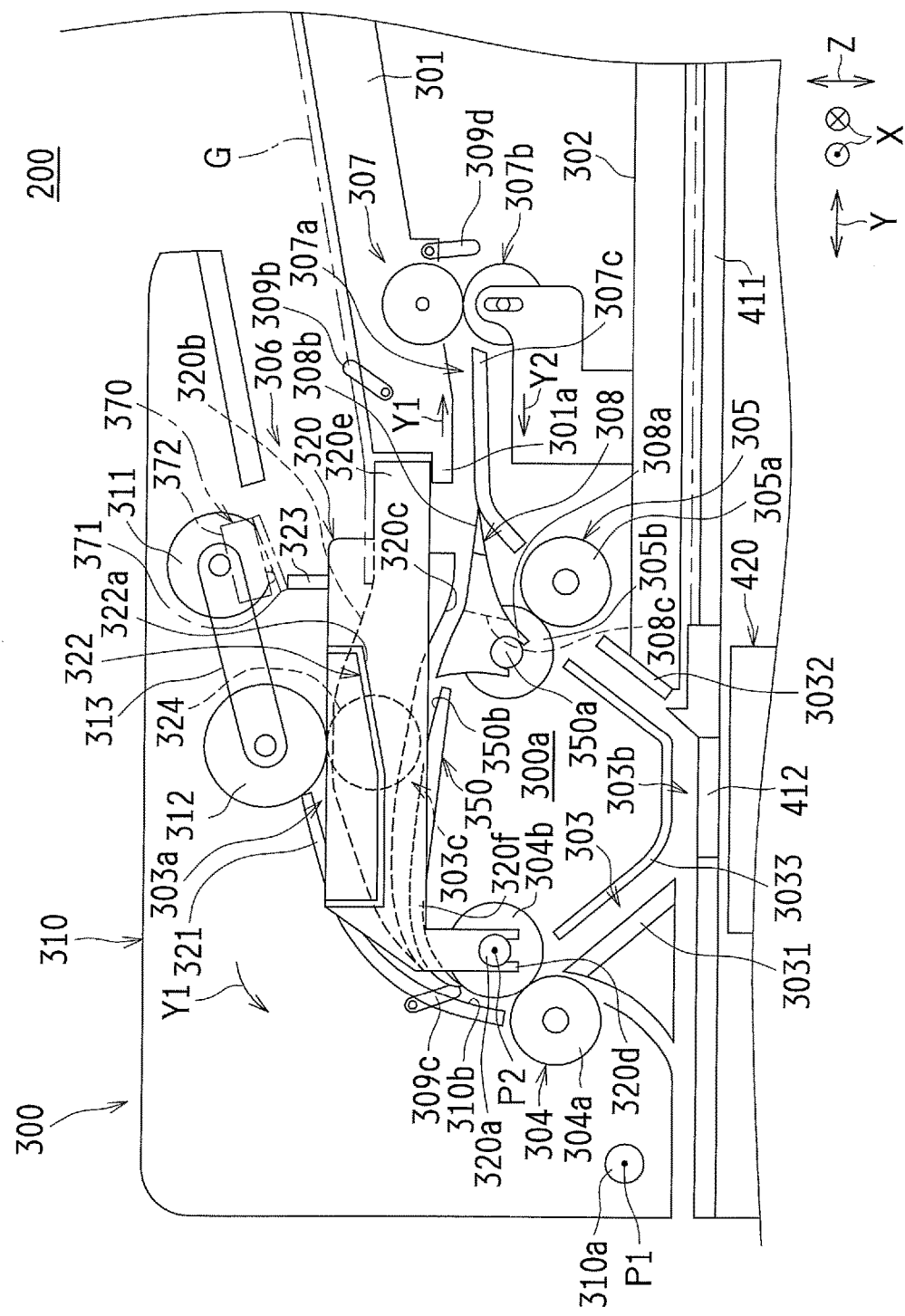
FIG. 5 is a schematic front view similar to FIG. 4, with a frame, a swingable member, and a biasing member removed.

FIG. 4 is a schematic front view of an example of the automatic document feeder 300 in the image reading apparatus 200 shown in FIG. 2, showing a sheet transport part on an enlarged scale. FIG. 5 is a schematic front view similar to FIG. 4, with a frame FL, a swingable member 330, and a biasing member 340 removed.

The automatic document feeder 300 is equipped with a sheet transport guide section 306 for guiding a document G to be transported.

The sheet transport guide section 306 has a first transport guide member 310 and a second transport guide member 320. The first transport guide member 310 is swingable about a first axis P1 (see FIGS. 4 and 5) which extends in the width directions X of the document G, the width directions X being orthogonal or substantially orthogonal to the transport direction Y1 of the document G.

To be more specific, the first transport guide member 310 is swingably arranged on a first swing axis 310a (see FIGS. 2, 4, and 5) which extends in the width directions X. In this example, the first swing axis 310a is fixed on the automatic document feeder main body 300a (an example of the sheet transport apparatus main body) (see FIGS. 3-5).

When the first transport guide member 310 is closed, the second transport guide member 320 is covered by the first transport guide member 310 and forms a first sheet transport path 303a (an example of the sheet transport path) for allowing passage of a document G between the second transport guide member 320 and the first transport guide member 310 (see FIGS. 2, 4, and 5). The second transport guide member 320 is swingable about a second axis P2 which extends in the width directions X (see FIGS. 4 and 5).

To be more specific, the second transport guide member 320 is swingably arranged on a second swing axis 320a (see FIGS. 2, 4, and 5) which extends in the width directions X. In this example, the pair of upstream transport rollers 304, composed of a first registration roller 304a and a second registration roller 304b (see FIGS. 4 and 5), temporarily stops a document G transported in the first sheet transport path 303a and resumes the transport of the document G at a predetermined timing. The first registration roller 304a is provided in the first transport guide member 310, and the second registration roller 304b is provided in the automatic document feeder main body 300a. The second swing axis 320a serves as the axis of rotation for the second registration roller 304b provided in the automatic document feeder main body 300a. Namely, the second transport guide member 320 is swingably provided on the axis of rotation of the second registration roller 304b (the second swing axis 320a).

The second transport guide member 320 is detachably provided on the axis of rotation of a roller, which in this example is the axis of rotation of the second registration roller 304b (the second swing axis 320a). Specifically, the second transport guide member 320 has a latch portion 320d (see FIGS. 4 and 5) to be latched on the second swing axis 320a. The latch portion 320d of the second transport guide member 320 is made of a flexible member such as a resin, and has a shape of the letter C which embraces the second swing axis 320a and whose opening is smaller than the diameter of the second swing axis 320a. The C-shaped latch portion 320d of the second transport guide member 320 can be removably fitted around the second swing axis 320a. Thus, the second transport guide member 320 can be arranged swingably around and detachably on the second swing axis 320a.

The automatic document feeder 300 is further equipped with a pick-up roller 311 (see FIGS. 1, 2, 4, and 5), a retard roller 312 (see FIGS. 1, 2, 4, and 5), and a separation member such as a separation roller or a separation pad (a separation roller 324 in this example).

The pick-up roller 311 and the retard roller 312 are provided in the first transport guide member 310. The pick-up roller 311 picks up a document G on the document tray 301 and feeds the document G in the transport direction Y1 from the document tray 301 to the first sheet transport path 303a. The retard roller 312, provided downstream of the pick-up roller 311 in the transport direction Y1, catches the document G conveyed by the pick-up roller 311 between the retard roller 312 and the separation roller 324 and transports the document G further downstream in the transport direction Y1.

The separation roller 324 is provided in the second transport guide member 320. With the separation roller 324 and the retard roller 312 being face to face with each other, the separation roller 324 separates one document G from another (to separate overlapping documents G) while one or more documents G are transported between the separation roller 324 and the retard roller 312.

In the thus configured automatic document feeder 300, the pick-up roller 311 feeds a document G in between the retard roller 312 and the separation roller 324, where overlapped documents G are separated from one another, and the rotationally driven retard roller 312 transports one document G after another. The document G transported by the retard roller 312 is guided into the first sheet transport path 303a and fed, one by one, between the pair of upstream transport rollers 304.

To be more specific, the pick-up roller 311 is capable of moving to and from a document G held on the document tray 301, by means of a pick-up roller driving unit (not shown). The pick-up roller 311 is connected with the retard roller 312 by a drive transmission means 313 including an endless belt and the like (see FIGS. 1, 2, 4, and 5), in such a manner as to rotate in the same direction as the retard roller 312. On receiving a request for scanning a document G, the pick-up roller 311 and the retard roller 312 are rotationally driven by a document feeder driving unit (not shown) in a rotation direction W (see FIG. 2) for transporting the document G in the transport direction Y1.

In this example, the automatic document feeder 300 is configured to transport a document G for scanning of one side (the front side), then to reverse the document G from one side to the other, and to transport the document G for scanning of the other side (the back side).

To be more specific, the sheet transport guide section 306 is configured to reverse a document G from one side to the other. The first transport guide member 310 has a first sheet guide surface 310b (see FIGS. 3-5) which faces one side (the front side) of the document G before reversal. The second transport guide member 320 has a second sheet guide surface 320b (see FIGS. 3-5) which faces the other side (the back side) of the document G before reversal, and a third sheet guide surface 320c (see FIGS. 4 and 5) which faces the other side (the back side) of the reversed document G.

The automatic document feeder 300 further includes a reverse sheet transport path 303b (see FIGS. 2, 4, and 5), a discharge transport part 307 (see FIGS. 1, 2, 4, and 5), and a third transport guide member 350 (see FIGS. 1, 2, 4, and 5).

The reverse sheet transport path 303b is arranged to reverse a document G from one side to the other while allowing passage of the document G conveyed from the first sheet transport path 303a. The main transport path 303 is composed of the first sheet transport path 303a and the reverse sheet transport path 303b.

To be more specific, the main transport path 303 is formed like a loop in which a document G is guided from the retard roller 312, through the pair of upstream transport rollers 304, the document reading glass 412, and the pair of downstream transport rollers 305, to the discharge transport part 307.

As shown in FIGS. 4 and 5, the automatic document feeder 300 is further equipped with an upstream guide 3031, a downstream guide 3032, and a document reading guide 3033, in the automatic document feeder main body 300a. The document reading guide 3033 is disposed above the document reading glass 412. The upstream guide 3031 and the downstream guide 3032 are disposed below the pair of upstream transport rollers 304 and the pair of downstream transport rollers 305, respectively.

To be more specific, the position of the upstream guide 3031 is downstream of the pair of upstream transport rollers 304 and upstream of the document reading glass 412 in the transport direction Y1. The position of the downstream guide 3032 is downstream of the document reading glass 412 and upstream of the pair of downstream transport rollers 305 in the transport direction Y1. The document reading guide 3033 faces the upstream guide 3031, the downstream guide 3032, and the document reading glass 412, with a predetermined gap therebetween. The reverse sheet transport path 303b is defined between a guide wall composed of the upstream guide 3031, the document reading glass 412 and the downstream guide 3032 and another guide wall composed of the document reading guide 3033.

At the discharge transport part 307, a document G which has been reversed from one side to the other in the reverse sheet transport path 303b is either discharged to the outside or transported backward during a discharging action.

To be more specific, the discharge transport part 307 includes a sheet discharge transport path 307a (see FIGS. 2, 4, and 5), a pair of discharge rollers 307b (see FIGS. 2, 4, and 5), a sheet guide unit 307c (see FIGS. 4 and 5) which forms the sheet discharge transport path 307a between the sheet guide unit 307c and a bottom surface of the document tray 301, and a discharge roller driving unit (not shown) which rotationally drives the pair of discharge rollers 307b.

The sheet discharge transport path 307a is configured to guide a document G transported through the reverse sheet transport path 303b to the discharge tray 302.

The pair of discharge rollers 307b is provided downstream of the pair of downstream transport rollers 305 in the transport direction Y1, specifically between the pair of downstream transport rollers 305 and the discharge tray 302. The pair of discharge rollers 307b not only transports a document G conveyed from the pair of downstream transport rollers 305 to the discharge tray 302, but also transports a document G conveyed from the pair of downstream transport rollers 305 backward in a reverse transport direction Y2 which is an opposite direction of the transport direction Y1 such that a trailing end of the document G (an upstream end in the transport direction Y1) serves as a leading end in the backward travel (see FIGS. 4 and 5).

The discharge roller driving unit is configured to transport a document G in the transport direction Y1 by driving the pair of discharge rollers 307b to rotate in a forward direction, or to transport (to switch back) a document G in the reverse transport direction Y2 by driving the pair of discharge rollers 307b to rotate in a reverse direction.

The third transport guide member 350 is provided (fixed) in the automatic document feeder main body 300a. When the second transport guide member 320 is closed, the third transport guide member 350 is covered by the second transport guide member 320 and forms a second sheet transport path 303c (see FIGS. 2, 4, and 5) between the third transport guide member 350 and the second transport guide member 320. The second sheet transport path 303c allows passage of the document G which is transported backward at the discharge transport part 307. The third transport guide member 350 has a fourth sheet guide surface 350b (see FIGS. 4 and 5) which faces one side (the front side) of the reversed document G.

The first sheet guide surface 310b in the first transport guide member 310 and the second sheet guide surface 320b in the second transport guide member 320 constitute the first sheet transport path 303a. The third sheet guide surface 320c in the second transport guide member 320 and the fourth sheet guide surface 350b in the third transport guide member 350 constitute the second sheet transport path 303c.

In this example, the automatic document feeder 300 further includes a branching member 308 (see FIGS. 1, 2, 4, and 5).

To be more specific about this automatic document feeder 300, the third transport guide member 350 and the branching member 308 are disposed under the second transport guide member 320, and the pair of downstream transport rollers 305 and the document reading guide 3033 are disposed under the third transport guide member 350 and the branching member 308.

The branching member 308 is disposed between an exit of the reverse sheet transport path 303b and an entry of the second sheet transport path 303c.

To be more specific, the branching member 308 is disposed at a branch into a passage from the reverse sheet transport path 303b to the sheet discharge transport path 307a and a passage from the sheet discharge transport path 307a to the second sheet transport path 303c. When the second transport guide member 320 is closed and covers the branching member 308, the branching member 308 guides a document G from the exit of the reverse sheet transport path 303b toward the discharge transport part 307 or guides a document G which is transported backward at the discharge transport part 307 toward the entry of the second sheet transport path 303c.

The sheet discharge transport path 307a serves not only as a forward transport path for a document G which is transported by forward rotation of the pair of discharge rollers 307b but also as a reverse transport path for a document G which is transported by reverse rotation of the pair of discharge rollers 307b.

After a document G is transported backward by the pair of discharge rollers 307b such that the trailing end of the document G serves as a leading end in the backward travel, the document G is guided by the branching member 308 into the second sheet transport path 303c. The second sheet transport path 303c guides the document G into the first sheet transport path 303a, on an upstream side of the pair of upstream transport rollers 304 in the transport direction Y1.

The branching member 308 is rotatable about a rotation axis extending in the width directions X of the document G, the width directions X being orthogonal or substantially orthogonal to the transport direction Y1 of the document G.

To be more specific, the branching member 308 is rotatably provided on a rotation axis 350a (see FIGS. 2, 4, and 5) extending in the width directions X. The pair of downstream transport rollers 305, composed of a first transport roller 305a and a second transport roller 305b (see FIGS. 4 and 5), is provided in the automatic document feeder main body 300a. The first transport roller 305a is disposed on an outer side of the loop-like main transport path 303, and the second transport roller 305b is disposed on an inner side of the loop-like main transport path 303. In this example, the rotation axis 350a is the axis of rotation of the second (inner) transport roller 305b provided in the automatic document feeder main body 300a. In other words, the branching member 308 is rotatably arranged on the rotation axis 350a of the second transport roller 305b.

Specifically, the branching member 308 has a substantially triangular shape in front view. The branching member 308 includes a C-shaped part 308a (see FIGS. 4 and 5) to be arranged on the rotation axis 350a. The C-shaped part 308a of the branching member 308 embraces the rotation axis 350a, and slidably rests on the outer circumferential surface of the rotation axis 350a. Owing to this arrangement, the branching member 308 allows the C-shaped part 308a to be rotatably engaged with the rotation axis 350a. Therefore, the branching member 308 can be arranged on the rotation axis 350*a* rotatably about the rotation axis 350*a*.

The branching member 308 is arranged to take either a first attitude (as shown in FIGS. 1, 2, 4 and 5) for guiding a document G from the sheet discharge transport path 307*a* to the second sheet transport path 303*c* or a second attitude for guiding a document G from the reverse sheet transport path 303*b* to the sheet discharge transport path 307*a*.

In this example, the branching member 308 blocks a path between the reverse sheet transport path 303*b* and the sheet discharge transport path 307*a* by its own weight, and opens a path between the sheet discharge transport path 307*a* and the second sheet transport path 303*c* by its own weight. To be more specific, a claw 308*b* (a tip end) of the branching member 308 (see FIGS. 4 and 5) normally abuts against the sheet guide unit 307*c*. When the leading end (the downstream end in the transport direction Y1) of the document G travels from the reverse sheet transport path 303*b* to the sheet discharge transport path 307*a*, the claw 308*b* is lifted upwardly about the rotation axis 350*a* by a force of transporting the document G, so that the branching member 308 takes the second attitude and permits the document G to be transported to the sheet discharge transport path 307*a*. After the trailing end of the document G passes the branching member 308, the claw 308*b* falls downwardly about the rotation axis 350*a*. Further, when the trailing end of the document G which is transported backward at the discharge transport part 307 travels from the sheet discharge transport path 307*a* to the second sheet transport path 303*c*, the branching member 308 keeps the first attitude and permits the document G to be transported to the second sheet transport path 303*c*.

Namely, the branching member 308 is normally disposed to block the path between the reverse sheet transport path 303*b* and the sheet discharge transport path 307*a* and to provide a direct connection between the sheet discharge transport path 307*a* and the second sheet transport path 303*c*. When the document G is transported from the reverse sheet transport path 303*b*, the branching member 308 is lifted by the leading end of the document G and allowed to guide the document G to the sheet discharge transport path 307*a*. After the document G passes the branching member 308, the claw 308*b* falls by its own weight. When the document G is transported backward from the sheet discharge transport path 307*a*, the branching member 308 guides the document G to the second sheet transport path 303*c*.

The size of a document G held on the document tray 301 is detected by document size sensors 309*a*, 309*a* (see FIGS. 1-3) provided in a document holding part of the document tray 301. The presence and absence of a document G on the document tray 301 is detected by a document detection sensor 309*b* (see FIGS. 1-5) which is provided in the document tray 301, in the vicinity of the pick-up roller 311 in the first transport guide member 310. The pair of upstream transport rollers 304, while stopped, abuts on and aligns the leading end of the document G transported from the retard roller 312. Later, the pair of upstream transport rollers 304 is rotationally driven in synchronization with the timing of scanning. The thus transported document G is detected by a transport sensor 309*c* (see FIGS. 1, 2, 4, and 5) which is positioned downwardly of a junction between the first sheet transport path 303*a* and the second sheet transport path 303*c* in the transport direction Y1 and upwardly of the pair of upstream transport rollers 304. The document G discharged by the pair of discharge rollers 307*b* is detected by a discharge sensor 309*d* (see FIGS. 1, 2, 4, and 5) provided on a discharge side near the pair of discharge rollers 307*b*. In this example, transport system rollers (such as the pair of upstream transport rollers 304, the pair of downstream transport rollers 305, and the pair of discharge rollers 307*b*) are driven by a transport system driving unit (not shown).

When the above-described image reading apparatus 200 receives a command to scan an image on a document G in a moving original exposure mode, the light source unit 420 stays at the fixed position V shown in FIG. 2, and the automatic document feeder 300 feeds the document G in the transport direction Y1 over the light source unit 420. Namely, one or more documents G held on the document tray 301 are pulled out by the pick-up roller 311, separated from each other by the retard roller 312 and the separation roller 324, and transported one by one into the first sheet transport path 303*a*. After the transport sensor 309*c* confirms that the document G is transported in the first sheet transport path 303*a*, the pair of upstream transport rollers 304 aligns the leading edge of the document G in order to prevent diagonal travelling. Later, at a predetermined timing of scanning, the pair of upstream transport rollers 304 feeds the document G to the document reading glass 412, with reversing the document G from one side to the other.

While the document G passes over the document reading glass 412, one side (the front side) of the document G is irradiated by the light source unit 420 through the document reading glass 412. The light is reflected by the one side (the front side) of the document G and then by the first mirror 422, has its optical path changed 180° by the second mirror 431 and the third mirror 432 in the mirror unit 430, travels through the condensing lens 440, and forms an image on the light-receiving surface 451 of the photoelectric transducer 450, where the document image is read and converted into electric image data.

For single-side (front-side) scanning, after one side (the front side) of the document G is scanned, the document G is pulled away from the document reading glass 412 by the pair of downstream transport rollers 305, guided through the sheet discharge transport path 307*a*, and discharged to the discharge tray 302 by the pair of discharge rollers 307*b* rotating in the forward direction.

For double-side (front-and-back-side) scanning, the document G is not discharged to the discharge tray 302 after one side (the front side) of the document G is scanned. Instead, the document G is transported to put its trailing end in the sheet discharge transport path 307*a*, and transported backward in the reverse transport direction Y2 by the pair of discharge rollers 307*b* rotating in the reverse direction. Via the branching member 308, the document G is guided into the second sheet transport path 303*c*. Through the second sheet transport path 303*c*, the document G returns to the first sheet transport path 303*a*. Then, the document G is transported by the pair of upstream transport rollers 304 and has the other side (the back side) scanned over the document reading glass 412. The reading operation by the photoelectric transducer 450 is similar to the one for the single-side scanning, and is not described herein.

After both sides are scanned, the document G is allowed to pass through the sheet discharge transport path 307*a* and is discharged to the discharge tray 302 by the pair of discharge rollers 307*b* rotating in the forward direction.

Other members illustrated in FIGS. 3, 4 and 5 with reference numerals/symbols but not described above will be described later.

(Sheet Transport Guide Section)

Figure 6:
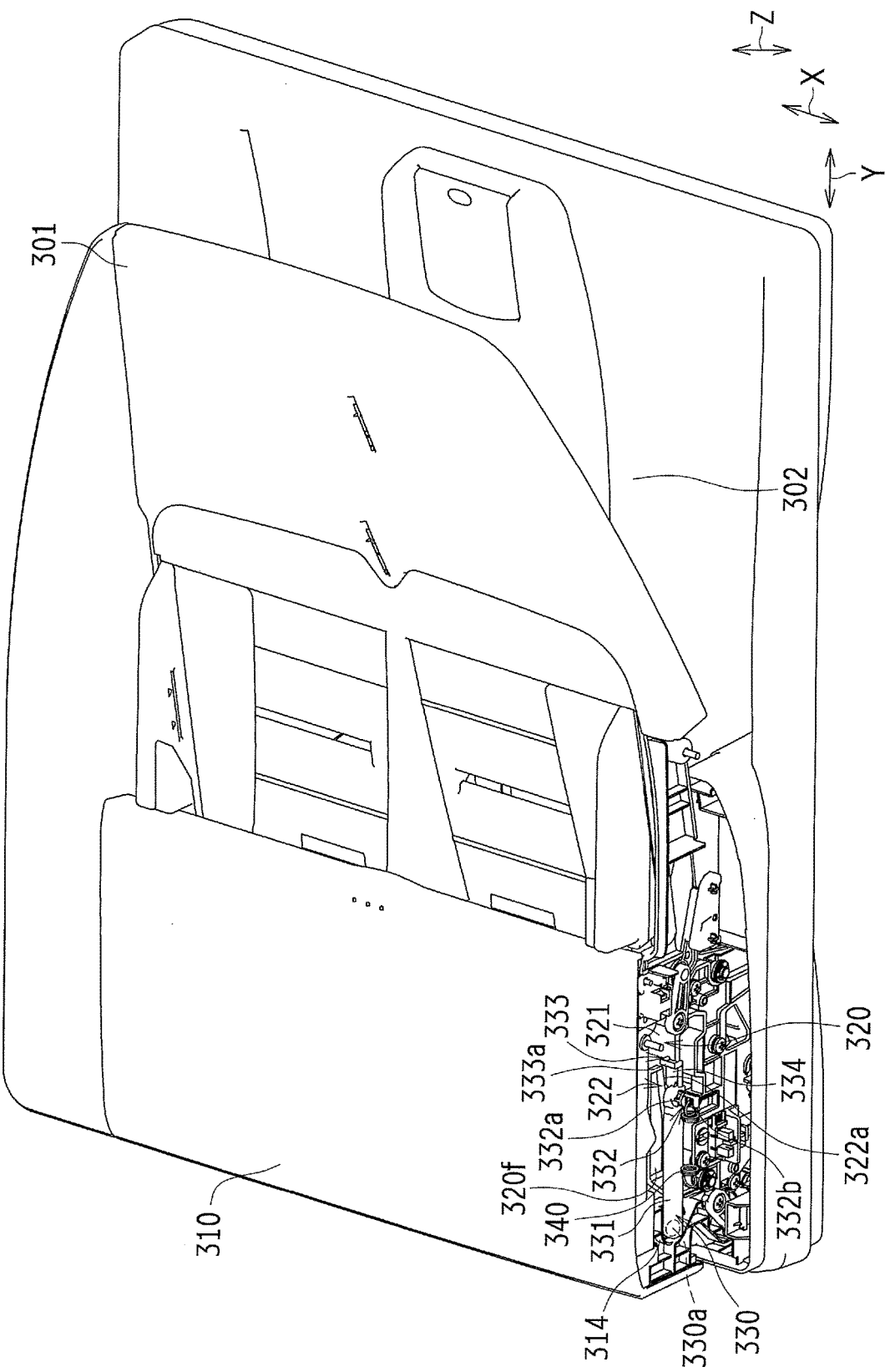
FIG. 6 is a perspective view of the automatic document feeder in the image reading apparatus shown in FIG. 4, with the first transport guide member closed.
Figure 7:
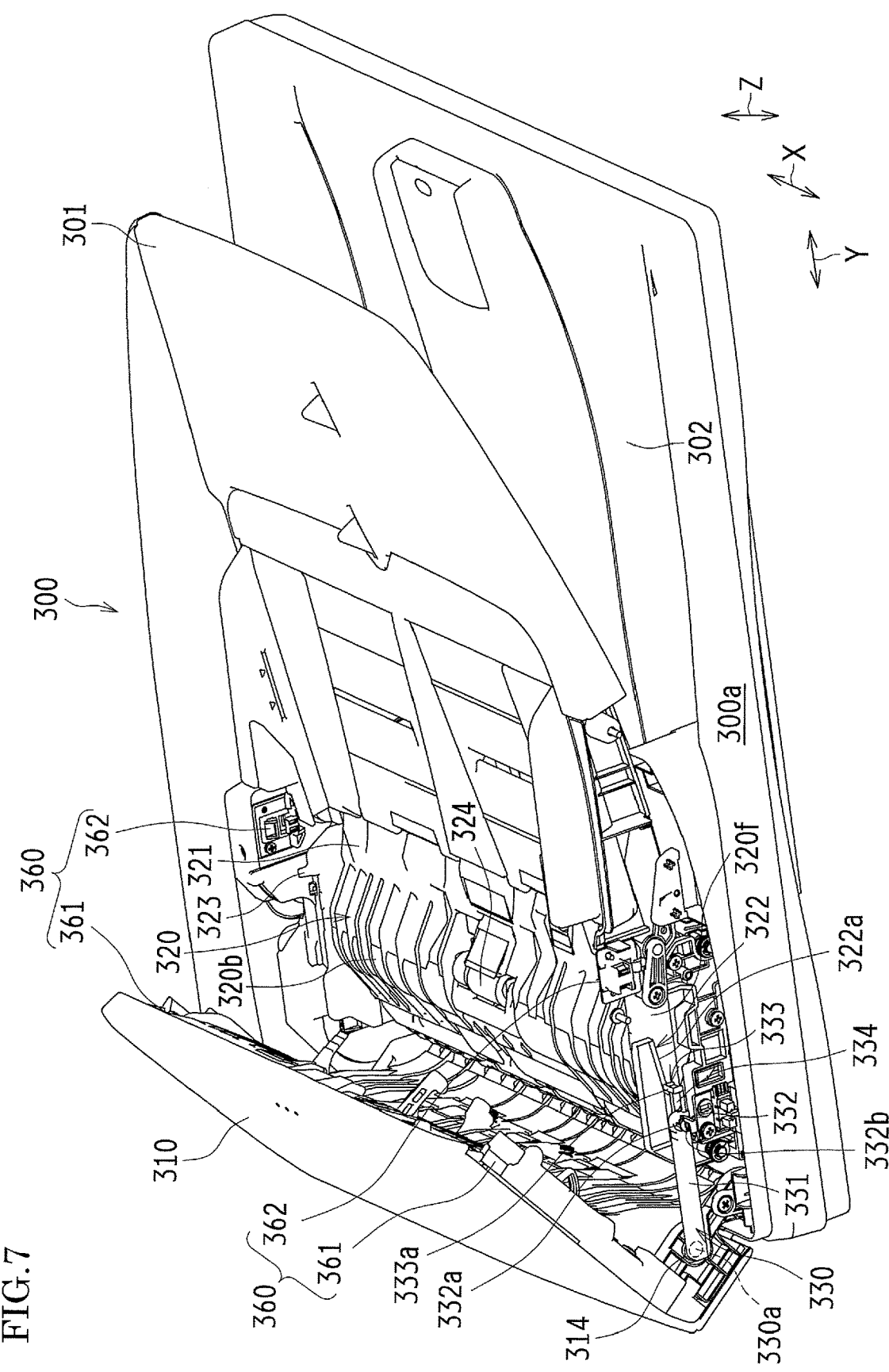
FIG. 7 is a perspective view of the automatic document feeder in the image reading apparatus shown in FIG. 4, with the first transport guide member open.
Figure 8:
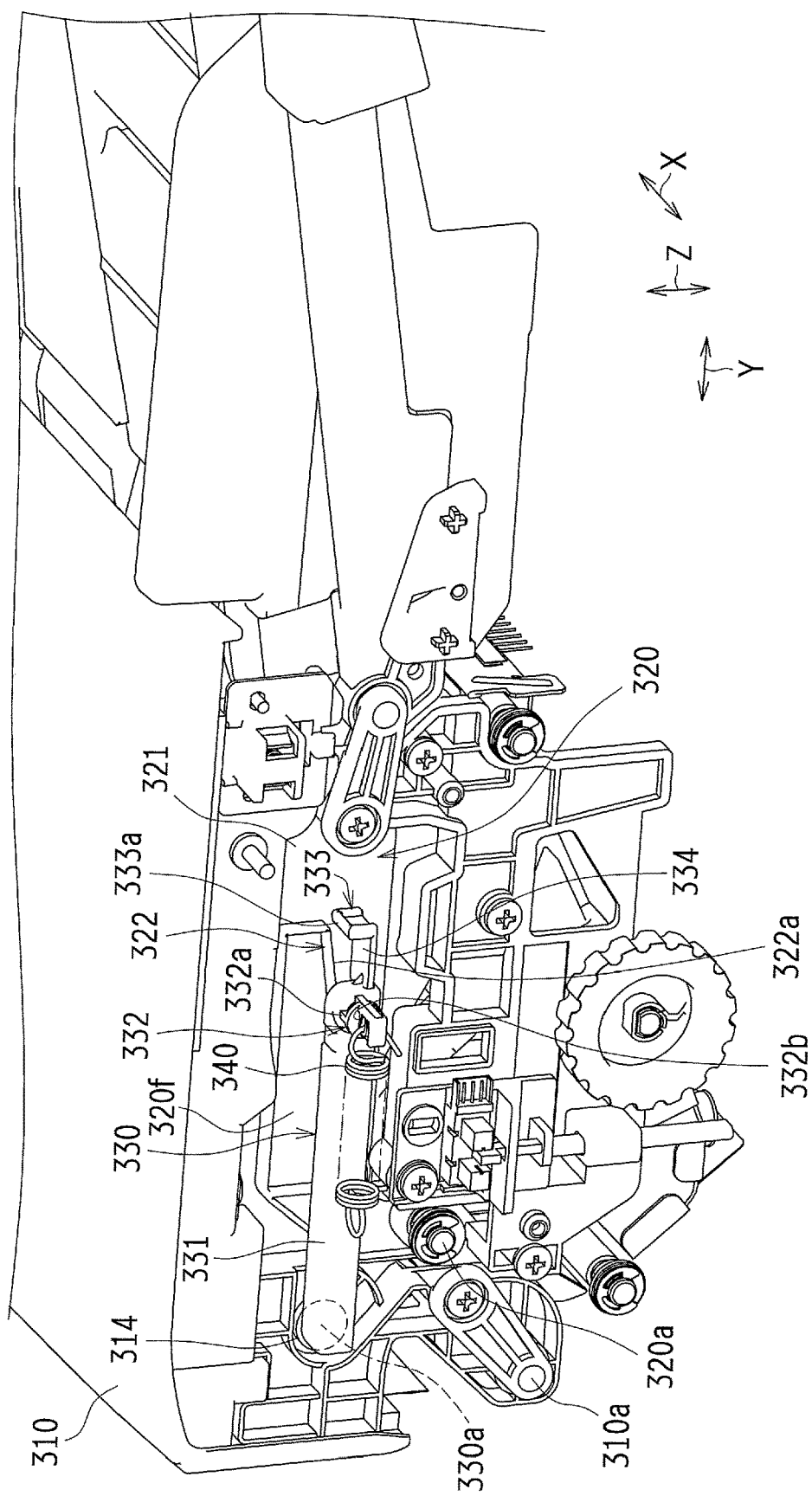
FIG. 8 is a partial perspective view of the automatic document feeder shown in FIG. 4, showing the first transport guide member, the second transport guide member, the swingable member, and the biasing member.

FIGS. 6 and 7 are perspective views of the automatic document feeder 300 in the image reading apparatus 200 shown in FIG. 4, with the first transport guide member 310 being closed and opened, respectively. FIG. 8 is a partial perspective view of the automatic document feeder 300 shown in FIG. 4, showing the first transport guide member 310, the second transport guide member 320, the swingable member 330, and the biasing member 340. In FIGS. 6 and 8, the automatic document feeder 300 is illustrated with the front cover and the frame FL removed. In FIG. 7, the automatic document feeder 300 is illustrated with the front cover, the frame FL, and the biasing member 340 removed.

Figure 9:
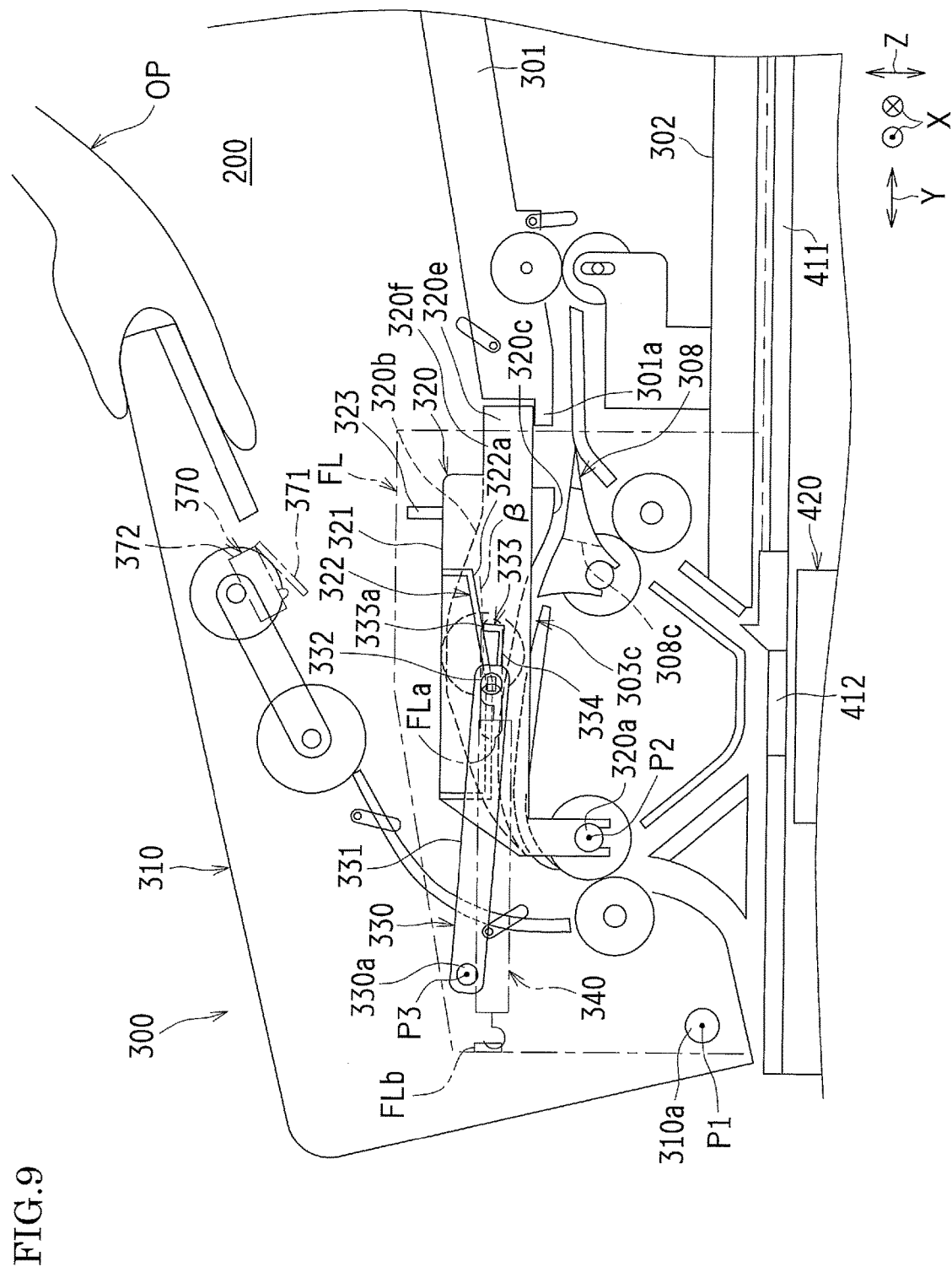
FIG. 9 is a schematic front view of a sheet transport part in the automatic document feeder shown in FIG. 4, with the first transport guide member in the process of opening or closing by an opening/closing operation by an operator, which causes the second transport guide member to move rotationally between the first position and the second position.
Figure 10:
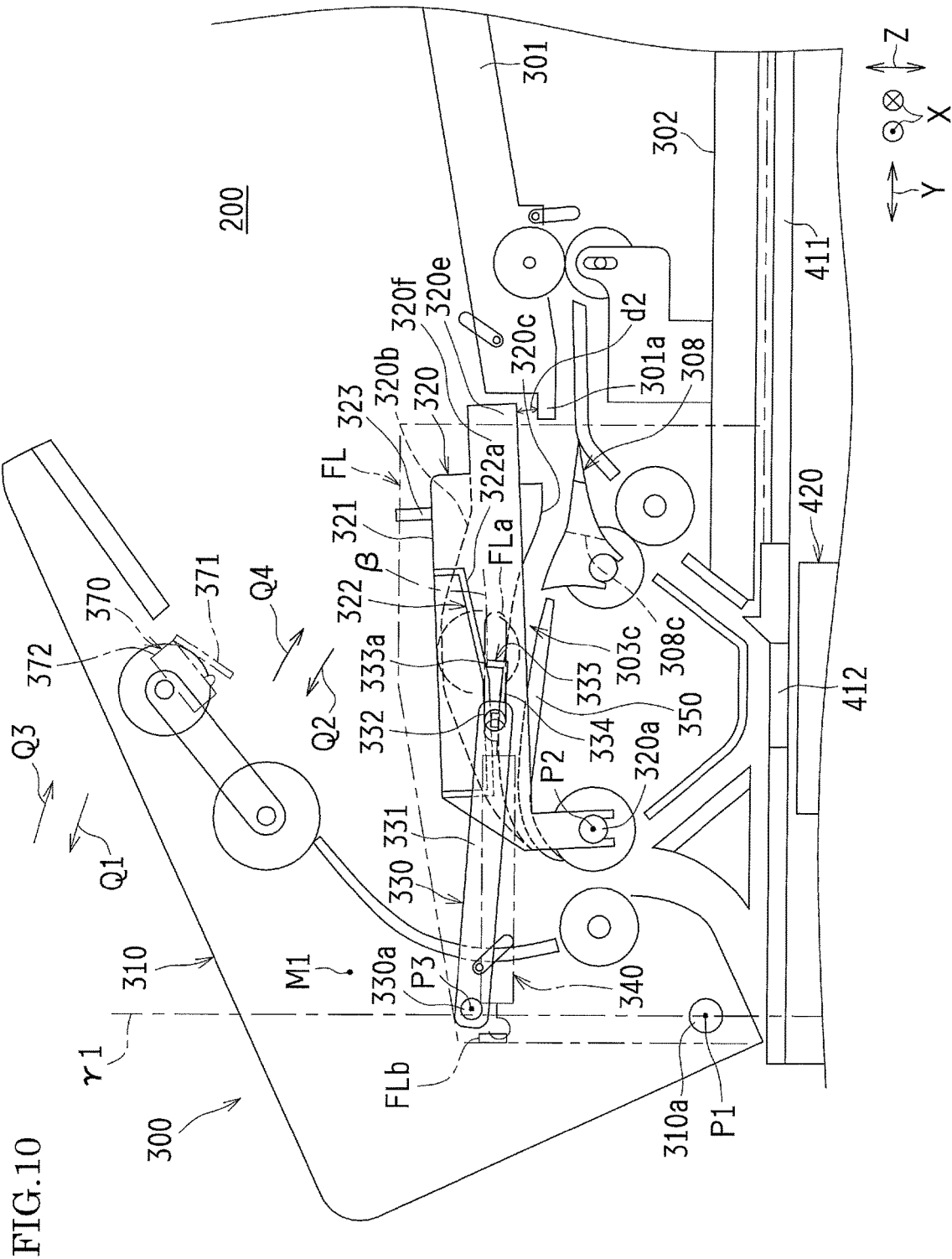
FIG. 10 is a schematic front view of the sheet transport part of the automatic document feeder shown in FIG. 4, with the first transport guide member fully open, which causes the second transport guide member to be at the second position.
Figure 11:
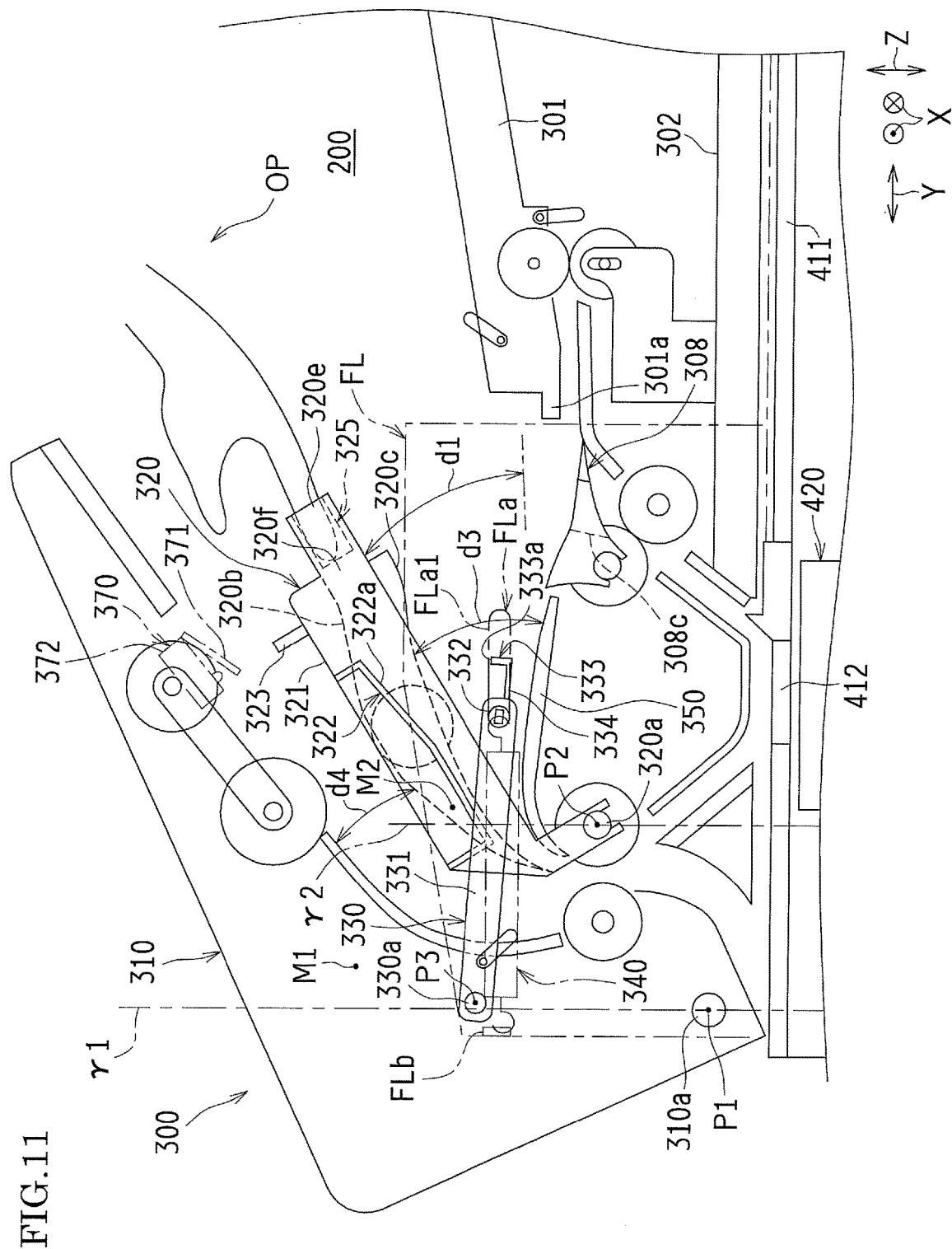
FIG. 11 is a schematic front view of the sheet transport part of the automatic document feeder shown in FIG. 4, with the first transport guide member fully open, wherein the second transport guide member is brought to a third position by an opening operation by an operator.

FIGS. 9-11 are schematic front views of the sheet transport part in the automatic document feeder 300 shown in FIG. 4. In FIG. 9, the first transport guide member 310 is in the process of opening or closing by an opening/closing operation by an operator OP, which causes the second transport guide member 320 to move rotationally between the first position and the second position. In FIG. 10, the first transport guide member 310 is fully open, which causes the second transport guide member 320 to be at the second position. In FIG. 11, the first transport guide member 310 is fully open, and the second transport guide member 320 is brought to a third position by an opening operation by an operator OP.

Figure 12:
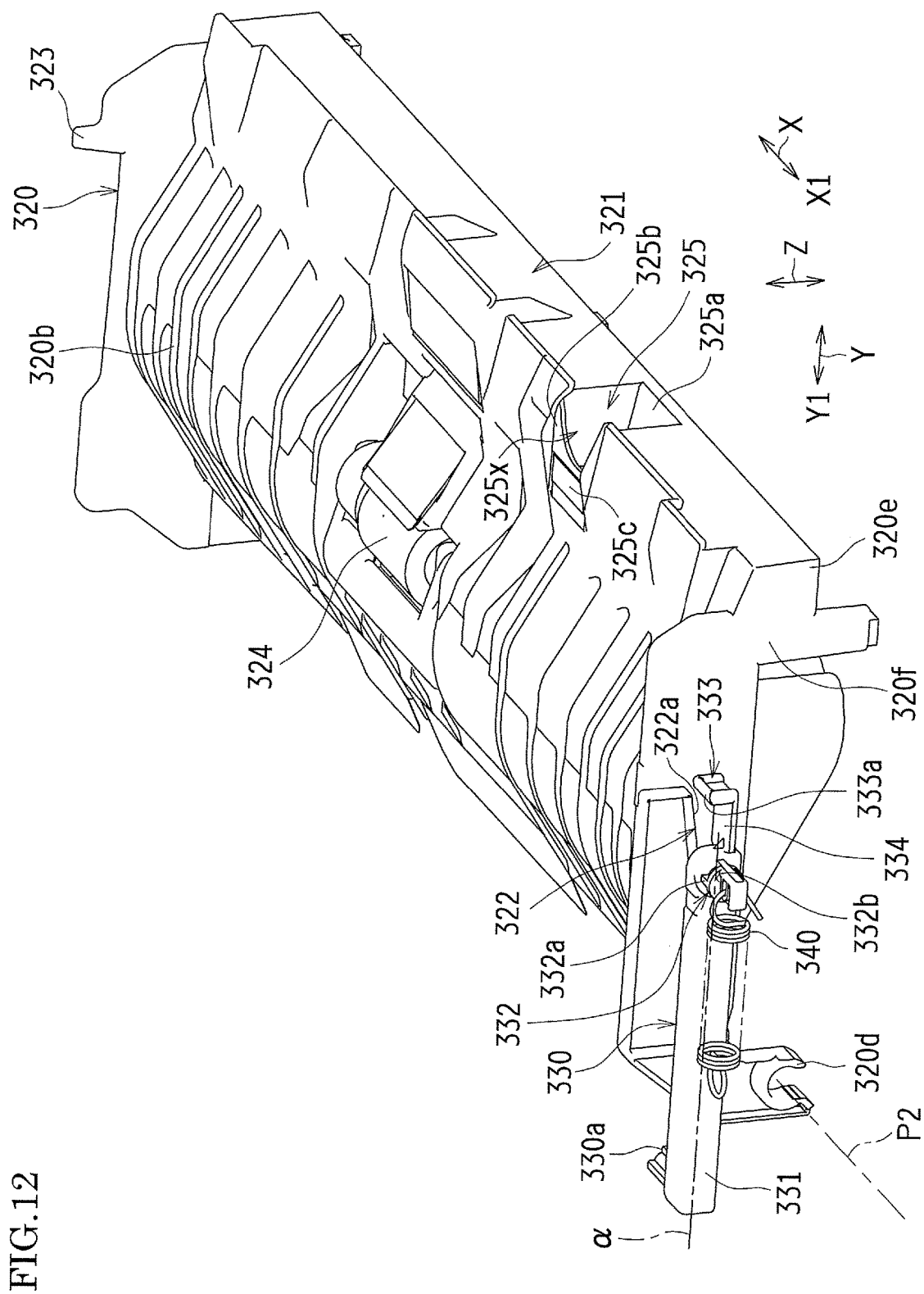
FIG. 12 is a perspective view of the second transport guide member, the swingable member, and the biasing member, extracted from the automatic document feeder.

FIG. 12 is a perspective view of the second transport guide member 320, the swingable member 330, and the biasing member 340, extracted from the automatic document feeder 300.

FIGS. 13(a)-13(f) represent a general configuration of the swingable member 330 in the automatic document feeder 300, respectively being a back view, a plan view, a front view, a bottom view, a left side view, and a right side view of the swingable member 330.

Figure 14A:
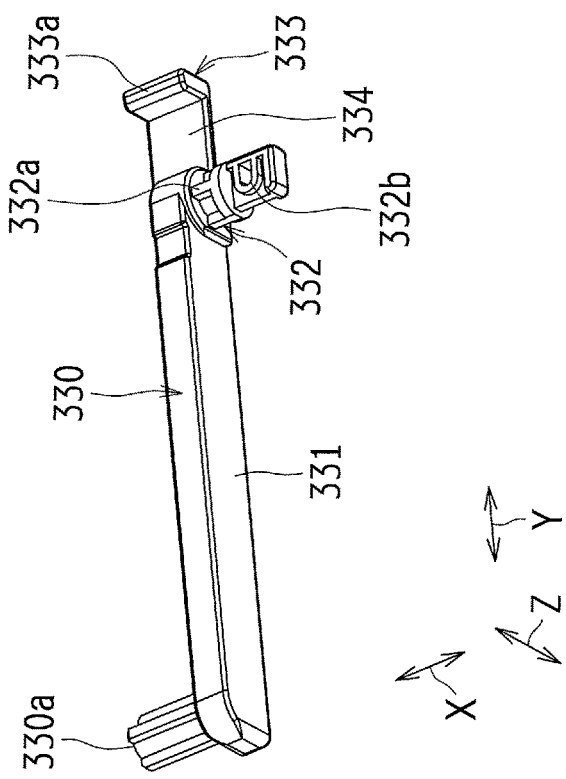
FIGS. 14(a) and 14(b) are front perspective views of the swingable member in the automatic document feeder, as seen from top right and from top left, respectively.
Figure 14B:
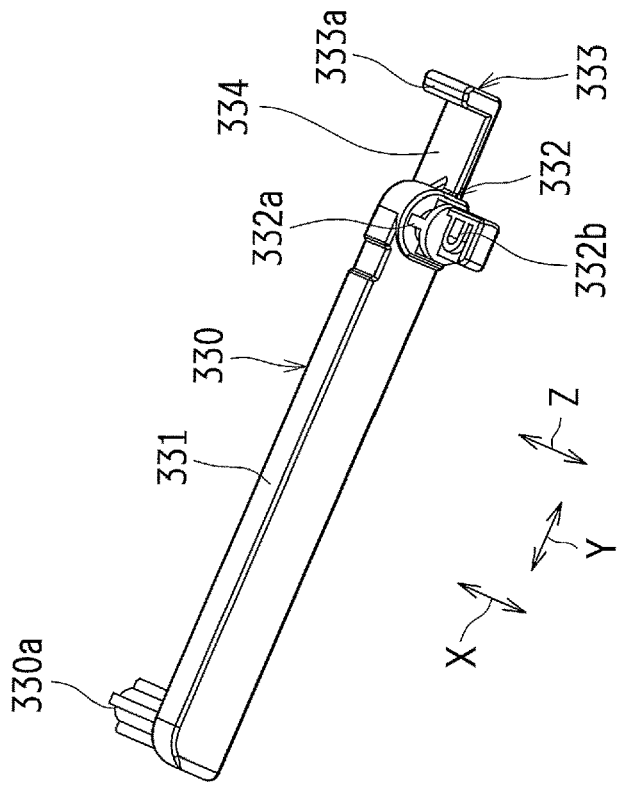

FIGS. 14(a) and 14(b) are front perspective views of the swingable member 330 in the automatic document feeder 300, as seen from top right and top left, respectively.

As shown in FIGS. 6-14, the sheet transport guide section 306 is further equipped with a swingable member 330.

The swingable member 330 is swingable about a third axis P3 (see FIGS. 4 and 9-11) extending in the width directions X, relative to the first transport guide member 310, at a different position from the first axis of the first transport guide member 310 (in this example, the first swing axis 310a).

To be more specific, the first transport guide member 310 is provided with a fulcrum part 314 (see FIGS. 6, 7, and 8). The swingable member 330 is provided swingably about the fulcrum part 314 in the first transport guide member 310. In this example, the fulcrum part 314 is a fulcrum hole which is depressed in one of the width directions X. The swingable member 330 includes a third swing axis 330a extending in the width direction X. By means of the third swing axis 330a, the swingable member 330 can be inserted in and removed from the fulcrum part 314 in the first transport guide member 310. The diameter of the fulcrum part 314 is greater by a predetermined amount than that of the third swing axis 330a so as to permit a smooth swinging movement of the swingable member 330. Owing to this arrangement, the swingable member 330 allows the third swing axis 330a to be removably inserted in the fulcrum part 314 in the first transport guide member 310. Hence, the swingable member 330 can be arranged removably in the fulcrum part 314 in the first transport guide member 310, swingably about the third swing axis 330a.

The swingable member 330 may be provided on at least one side (the front side, the back side, or both) of the sides of the first transport guide member 310 in the width directions X. In this example, the swingable member 330 is provided only on one side (specifically, the front side) of the first transport guide member 310 in the width directions X.

In the automatic document feeder 300, the second transport guide member 320 is arranged at a first position (the position shown in FIG. 4) when the first transport guide member 310 is closed, at a second position (the position shown in FIG. 10) where the second transport guide member 320 is opened from the first position (specifically, opens by a predetermined angular degree) when the first transport guide member 310 is opened (specifically, opened fully), or at a third position (the position shown in FIG. 11) where the second transport guide member 320 is opened from the second position.

The second position of the second transport guide member 320 may be, for example, a position where the second transport guide member 320 opens from the first position by a predetermined angular degree, to such an extent that an operator OP (e.g. a user) can recognize that the second transport guide member 320 can be opened and closed, and/or, that an operator OP can see a document G jammed at the second transport guide member 320 on the far side of the first transport guide member 310 (in this example, jammed in the second sheet transport path 303c or the reverse sheet transport path 303b). The third position of the second transport guide member 320 is set downstream of the second position in an open direction Q2 about the second axis P2.

First Embodiment

The automatic document feeder 300 according to First Embodiment is configured as below. When the first transport guide member 310 is opened or closed by an opening/closing operation by an operator OP (see FIG. 9), the first transport guide member 310 moves in an opening/closing direction about the first axis (in this example, the first swing axis 310a), followed by a swinging movement of the swingable member 330 about the third axis P3 (in this example, the third swing axis 330a). In synchronization with the swinging movement of the swingable member 330, the second transport guide member 320 is caused to swing about the second axis P2 (in this example, the second swing axis 320a).

To be more specific about this automatic document feeder 300, when the first transport guide member 310 is opened by an opening operation by an operator OP for opening the first transport guide member 310, the first transport guide member 310 opens in an open direction Q1 (see FIG. 10, counterclockwise in front view) about the first swing axis 310a, followed by a swinging movement of the swingable member 330 relative to the first transport guide member 310. In synchronization with the swinging movement of the swingable member 330, the second transport guide member 320 is caused to swing in an open direction Q2 (see FIG. 10, counterclockwise in front view) about the second swing axis 320a.

Further in the automatic document feeder 300, when the first transport guide member 310 is closed by a closing operation by an operator OP for closing the first transport guide member 310, the first transport guide member 310 closes in a closing direction Q3 (see FIG. 10, clockwise in front view) about the first swing axis 310a, followed by a swinging movement of the swingable member 330 relative to the first transport guide member 310. In synchronization with the swinging movement of the swingable member 330, the second transport guide member 320 is caused to swing in a closing direction Q4 (see FIG. 10, clockwise in front view) about the second swing axis 320a.

First Embodiment-1

In the automatic document feeder 300 according to First Embodiment-1, even when the second transport guide member 320 is opened or closed by an opening/closing operation by an operator OP, the first transport guide member 310 and the swingable member 330 are arranged not to swing in synchronization with an opening/closing movement of the second transport guide member 320 about the second swing axis 320a.

To be more specific about this automatic document feeder 300, when the second transport guide member 320 is opened or closed by an opening/closing operation by an operator OP (see FIG. 11) while the first transport guide member 310 is open, the second transport guide member 320 is arranged to be opened or closed about the second axis P2 (in this example, the second swing axis 320a), independently of the first transport guide member 310 and the swingable member 330.

Specifically, in the closed state, the second transport guide member 320 is in proximity to or in contact with (in this example, in proximity to) the swingable member 330 in a swingable manner about the second swing axis 320a. The second transport guide member 320 may be brought into proximity to or into contact with the swingable member 330 either by a biasing force applied by a biasing member toward the swingable member 330 or by its own weight. In this example, the second transport guide member 320 in the closed state is in proximity with the swingable member 330, with an upstream end 320e (see FIGS. 4, 5, and 9-12) in the transport direction Y1 resting on a downstream end 301a of the document tray 301 in the transport direction Y1 (see FIGS. 4, 5, and 9-11) by its own weight.

First Embodiment-2

In First Embodiment-2, the swingable member 330 has a reciprocating part 332 and an abutting part 333. When the swingable member 330 swings about the third axis P3 (in this example, the third swing axis 330a) along with the opening movement of the first transport guide member 310, the reciprocating part 332 moves along a path extending in reciprocating directions (in this example, the crosswise directions Y) which are orthogonal or substantially orthogonal to the width directions X. The abutting part 333 is provided on the reciprocating part 332 and arranged to abut on the second transport guide member 320.

To be more specific about this automatic document feeder 300, the opening movement of the first transport guide member 310 is followed by a swinging movement of the swingable member 330 about the third swing axis 330a relative to the first transport guide member 310. At the same time, the reciprocating part 332 of the swingable member 330 is caused to move in one of the reciprocating directions (the crosswise directions Y). Namely, the automatic document feeder 300 causes the reciprocating part 332 to reciprocate in the crosswise directions Y between the first position of the first transport guide member 310 where the first transport guide member 310 is closed (the position shown in FIG. 4) and the second position of the first transport guide member 310 where the first transport guide member 310 is opened fully (the position shown in FIG. 10).

Specifically, the swingable member 330 has an elongated (stick-like) swingable member main body 331. The third swing axis 330a is provided at an end of the swingable member main body 331, and the reciprocating part 332 is provided at the other end of the swingable member main body 331.

The automatic document feeder main body 300a includes a guide part FLa (see FIGS. 2-4 and 9-11) for guiding the reciprocating part 332 in the reciprocating directions (in this example, the crosswise directions Y).

The guide part FLa may be, for example, a rib member, an elongated bore, or a groove to be engaged with the reciprocating part 332 of the swingable member 330. In the present specification, the term "rib" means a ridge elongated in a certain direction, the term "bore" means a through bore, and the term "hole" means a blind hole.

In this example, the guide part FLa has an elongated bore FLa1 (see FIGS. 3 and 11) extending in the crosswise directions Y. The guide part FLa may be also equipped with a limitation part for limiting an excessive swinging movement of the first transport guide member 310 in the open direction Q1 beyond the predetermined full-open position (the position shown in FIG. 10) when the first transport guide member 310 is opened.

To be more specific, the automatic document feeder 300 is further equipped with a frame FL (in this example, a front frame) (see FIGS. 9-11) provided in the automatic document feeder main body 300a. The frame FL is a plate-like member extending in both the height directions Z and the crosswise directions Y in the automatic document feeder main body 300a. The guide part FLa is provided in the frame FL.

Specifically, the frame FL is designed to receive the reciprocating part 332 of the swingable member 330 in the elongated bore FLa1 of the guide part FLa. An end of the elongated bore FLa1 in the crosswise directions Y serves as a limitation part for limiting an excessive swinging movement of the first transport guide member 310 in the open direction Q1 beyond the predetermined full-open position.

The reciprocating part 332 of the swingable member 330 is provided with an engagement portion 332a (see FIGS. 6-8 and 12-14) to be engaged with the guide part FLa of the frame FL. In this example, the engagement portion 332a has a circular shape in front view (as seen in the width directions X).

The width of the elongated bore FLa1 is greater by a predetermined amount than the diameter of the engagement portion 332a so as to permit a smooth reciprocating movement of the reciprocating part 332. Owing to this arrangement, the frame FL allows a smooth sliding movement of the engagement portion 332a of the reciprocating part 332 along the elongated bore FLa1. Thus, the swingable member 330 allows the reciprocating part 332 of the swingable member 330 to reciprocate smoothly in the crosswise directions Y along the elongated bore FLa1 in the frame FL.

In the state where the first transport guide member 310 is closed, the swingable member 330 is oriented such that an imaginary straight line α (see FIG. 12) which passes through the center of the third swing axis 330a and the center of the reciprocating part 332 is level in the crosswise directions Y.

The abutting part 333 has a sliding surface 333a (see FIGS. 4 and 6-14) which slides along the second transport guide member 320. The sliding surface 333a of the abutting part 333 has a curved convex shape which curves in the crosswise directions Y (FIGS. 8 and 12-14). In the state where the first transport guide member 310 is closed, the abutting part 333 is oriented in the height directions Z. An end face of the abutting part 333 facing the second transport guide member 320 in the height directions Z constitutes the sliding surface 333a.

The second transport guide member 320 is equipped with a sliding contact guide part 322 (see FIGS. 6-12). When the reciprocating part 332 of the swingable member 330 moves in one of the reciprocating directions (in this example, to the left in front view in the crosswise directions Y), the sliding contact guide part 322 is arranged to come into sliding contact with the abutting part 333 of the swingable member 330, and thereby to cause the second transport guide member 320 to be lifted about the second axis P2 (in this example, the second swing axis 320a).

The sliding contact guide part 322 may be, for example, a rib member, an elongated bore, or a groove to be engaged with the abutting part 333 of the swingable member 330.

In this example, the second transport guide member 320 has a plate-shaped second transport guide member main body 321. The second transport guide member main body 321 has, in thickness directions thereof, a second sheet guide surface 320b on one side and a third sheet guide surface 320c on the other side. The separation roller 324 is provided on the one side of the second transport guide member main body 321. The sliding contact guide part 322 is provided on a side 320f (in this example, the front side) (see FIGS. 4-12), which is a side closer to the swingable member 330 in the width directions X of the second transport guide member main body 321. The sliding contact guide part 322 is a rib member which protrudes outwardly in one of the width directions X (in this example, to the front side). The sliding contact guide part 322 has a sliding contact surface 322a (see FIGS. 4-12) which comes into sliding contact with the sliding surface 333a of the abutting part 333 in the swingable member 330.

During a sliding movement of the swingable member 330, a point of contact between the sliding contact surface 322a and the swingable member 330 (in this example, the sliding surface 333a) leaves a locus of movement β (see FIGS. 4, 9, and 10). In the state where the first transport guide member 310 is closed, the sliding contact surface 322a intersects the locus of movement β between the first position of the first transport guide member 310 (see FIG. 4) and the second position of the first transport guide member 310 (see FIG. 10). In this example, in the state where the first transport guide member 310 is closed, the sliding contact surface 322a is an inclined surface in which one side of the sliding contact surface 322a in the crosswise directions Y (in this example, the left side in front view) which is a side closer to the third swing axis 330a is lower than the other side (in this example, the right side in front view) which is a far side of the third swing axis 330a The sliding contact guide part 322 is arranged to lift the second transport guide member 320 in the open direction Q2 about the second swing axis 320a by such a predetermined degree that, when the first transport guide member 310 is open (fully open), an operator OP can recognize that the second transport guide member 320 can be opened and closed (see FIG. 10).

Specifically, the second transport guide member main body 321 and the sliding contact guide part 322 are formed as a single piece to constitute the second transport guide member 320.

First Embodiment-3

In First Embodiment-3, the swingable member 330 further includes a supporting part 334 (see FIGS. 6-14). The abutting part 333 is supported by the reciprocating part 332 by means of the supporting part 334.

To be more specific, in the state where the first transport guide member 310 is closed, the supporting part 334 is oriented in the crosswise directions Y. An end of the supporting part 334 is arranged at an end of the swingable member main body 331 on which the reciprocating part 332 is mounted, and another end is arranged at an end of the abutting part 333 opposite to the sliding surface 333a. In this example, the supporting part 334 is provided at a far side of the sliding contact guide part 322 relative to the center of (specifically, provided lower than the center of) the swingable member main body 331 in the height directions Z. The supporting part 334 is flexible.

Specifically, the swingable member main body 331, the third swing axis 330a, the reciprocating part 332, the abutting part 333, and the supporting part 334 are formed as a single piece to constitute the swingable member 330.

Materials for the swingable member 330 include, for example, resins (such as polyacetal resins and polyamide resins) which have excellent elasticity (particularly, elasticity at the supporting part 334) and excellent slipping property (particularly, slipping property at the abutting part 333).

First Embodiment-4

In First Embodiment-4, the automatic document feeder 300 also includes a biasing member 340 (see FIGS. 1-4, 6, and 8-12) provided between the reciprocating part 332 of the swingable member 330 and the frame FL. The biasing member 340 biases, by means of the swingable member 330, the first transport guide member 310 in the open direction Q1 about the first axis (in this example, the first swing axis 310a).

To be more specific, the biasing member 340 is a long, general-purpose coil spring. In the state where the first transport guide member 310 is closed, the biasing member 340 is oriented in the reciprocating directions (in this example, the crosswise directions Y) and arranged between the reciprocating part 332 and the frame FL.

Specifically, the frame FL is provided with a latch portion FLb (in this example, a latch bore) (see FIGS. 3, 4, and 9-11). The reciprocating part 332 is provided with a latch portion 332b (in this example, a latch bore) (see FIGS. 3, 6-8, and 12-14). An end of the biasing member 340 is connected with the latch portion FLb of the frame FL, and another end is connected with the latch portion 332b of the reciprocating part 332.

In this example, the automatic document feeder 300 further includes lock mechanisms 360 (see FIGS. 3 and 7) for releasably locking the first transport guide member 310 on the automatic document feeder main body 300a when the first transport guide member 310 is closed.

Each lock mechanism 360 may be, for example, a fit engagement lock mechanism for locking the first transport guide member 310 on the automatic document feeder main body 300a by releasable fit engagement, or a lever lock mechanism for releasably latching and locking the first transport guide member 310 on the automatic document feeder main body 300a by means of a lever having a gripper to be held by a user.

The lock mechanisms 360 in this example are fit engagement lock mechanisms. Each lock mechanism 360 includes a recess 361 which is depressed in one of the width direction X and a protrusion 362 which protrudes in the width direction X to be latched in the recess 361. Either of the recess 361 or the protrusion 362 (in this example, the recess 361) is provided with respect to the first transport guide member 310, and the other one (in this example, the protrusion 362) is provided with respect to the automatic document feeder main body 300a. Further, either of the recess 361 or the protrusion 362 (in this example, the protrusion 362) is biased by a biasing member such as a spring (not shown) toward the center in the width directions X (in this example, biased in the protruding direction), but is permitted to move outwardly in the width directions X (in this example, to move in the retracting direction) against the biasing force of the biasing member.

First Embodiment-5

In First Embodiment-5, when the first transport guide member 310 is opened (specifically, opened fully), the first transport guide member 310 is arranged to stop at its first position (see FIGS. 10 and 11) where the center of gravity M1 of the first transport guide member 310 (see FIGS. 10 and 11) is on a closed side of the first transport guide member 310 (a side to which the first transport guide member 310 closes by its own weight) (on the right side in FIGS. 10 and 11) relative to an imaginary vertical line γ1 (see FIGS. 10 and 11) which passes through the first axis P1. In this description, the imaginary vertical line γ1 is a straight line perpendicular to a horizontal plane.

In this example, the first transport guide member 310 is arranged to stop at its first position by the biasing member 340 which limits rotational movement of the first transport guide member 310 in the closing direction Q3.

First Embodiment-6

In First Embodiment-6, the second transport guide member 320 is arranged to be brought to its second position (the position shown in FIG. 10) by the swingable member 330 which swings with the opening/closing movement of the first transport guide member 310.

First Embodiment-7

In First Embodiment-7, the second transport guide member 320 is arranged to be rotatably opened and closed at its second position (the position shown in FIG. 10). Namely, if a user opens or closes the second transport guide member 320 from the second position and lets go of the second transport guide member 320 at a downstream side in the open direction Q2 about the second axis P2, the second transport guide member 320 is arranged to rotate (fall) by its own weight.

First Embodiment-8

In First Embodiment-8, the second transport guide member 320 is arranged to stop at its third position (the position shown in FIG. 11). Namely, if the second transport guide member 320 is opened from the second position, the second transport guide member 320 is arranged to stop at a downstream side in the open direction Q2 about the second axis P2.

To be more specific, when the second transport guide member 320 is opened, the second transport guide member 320 is arranged to stop at the third position (the position shown in FIG. 11) where the center of gravity M2 of the second transport guide member 320 (see FIG. 11) is on a closed side of the second transport guide member 320 (a side to which the second transport guide member 320 closes by its own weight) (on the right side in FIG. 11) relative to an imaginary vertical line γ2 (see FIG. 11) which passes through the second axis P2. In this description, the imaginary vertical line γ2 is a straight line perpendicular to a horizontal plane.

In this example, the second transport guide member 320 is arranged to be latched (locked) (to be stopped) at its third position by fit engagement with the automatic document feeder main body 300a (specifically, an outer cover member 300x).

Figure 15:
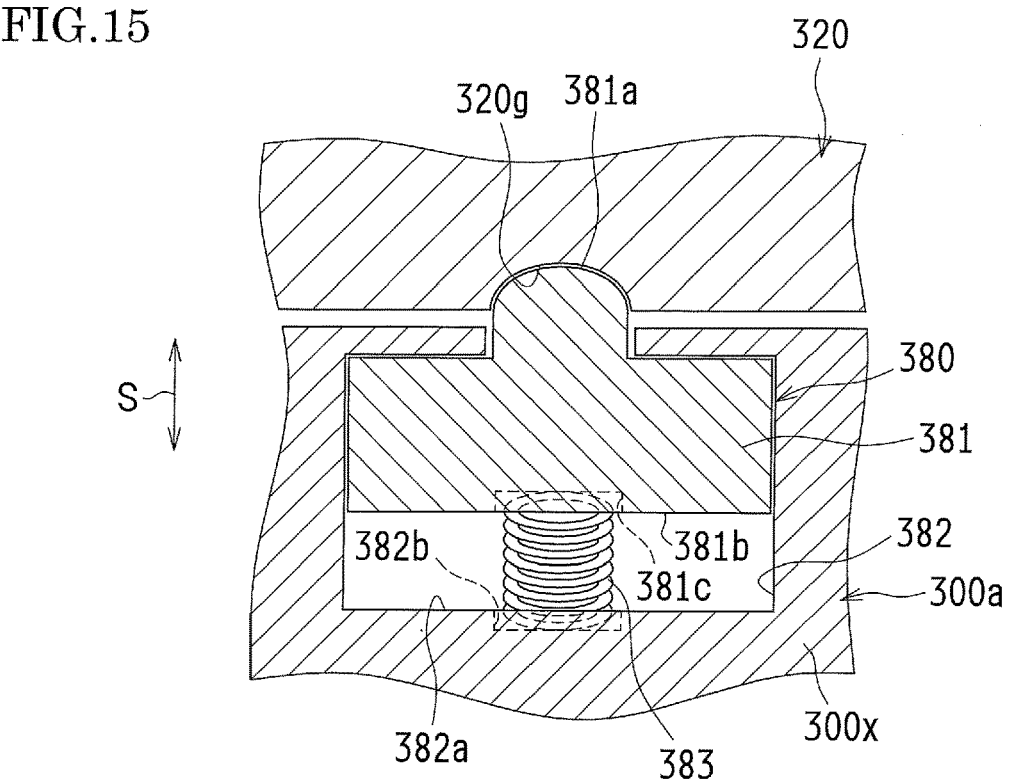
FIG. 15 is a schematic sectional view showing an example of an engagement arrangement by which the second transport guide member is engaged with an automatic document feeder main body by fit engagement when the second transport guide member stops at its third position, wherein an exemplary dent in the second transport guide member is engaged with an exemplary stud in the automatic document feeder main body.
Figure 16:
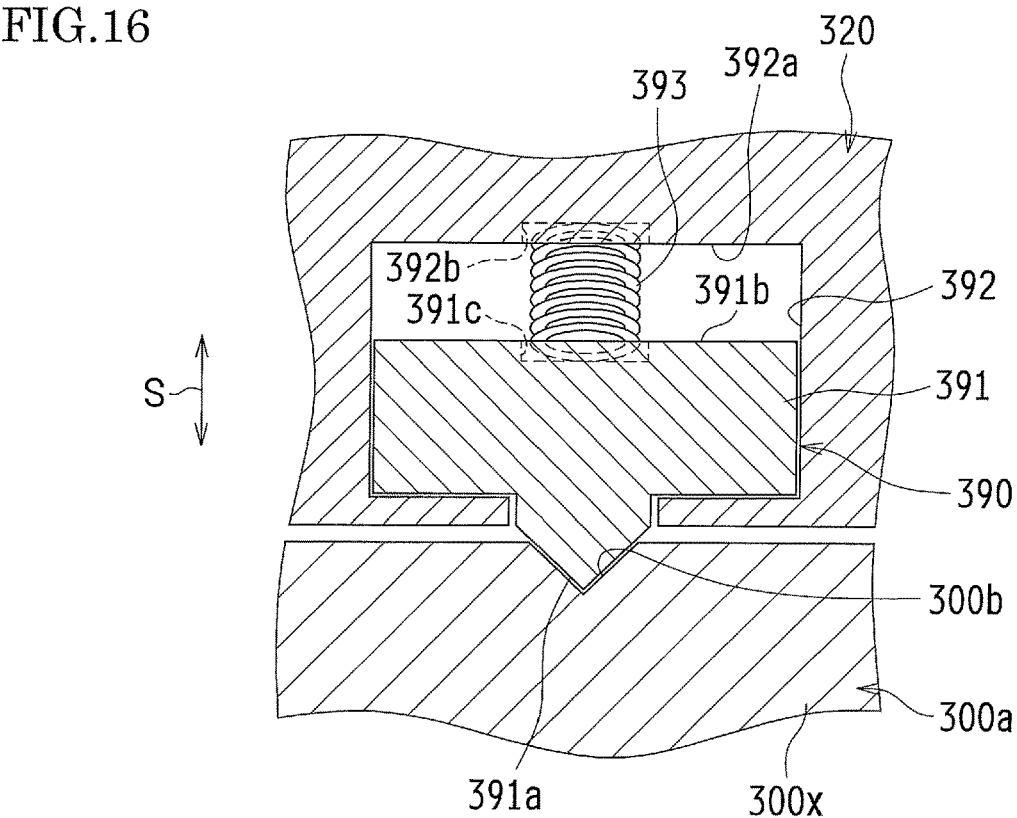
FIG. 16 is a schematic sectional view showing an example of an engagement arrangement by which the second transport guide member is engaged with an automatic document feeder main body by fit engagement when the second transport guide member stops at its third position, wherein an exemplary stud in the second transport guide member is engaged with an exemplary dent in the automatic document feeder main body.

FIGS. 15 and 16 are schematic sectional views showing examples of an engagement arrangement by which the second transport guide member 320 is engaged with the automatic document feeder main body 300a by fit engagement when the second transport guide member 320 stops at its third position. In FIG. 15, an exemplary dent 320g in the second transport guide member 320 is engaged with an exemplary stud 381a in the automatic document feeder main body 300a. In FIG. 16, an exemplary stud 391a in the second transport guide member 320 is engaged with an exemplary dent 300b in the automatic document feeder main body 300a.

The second transport guide member 320 is provided with a dent 320g (see FIG. 15), or a stud 391a (see FIG. 16) which retractably projects under a predetermined pressure.
—Fit Engagement Arrangement in FIG. 15—

In the arrangement shown in FIG. 15, the second transport guide member 320 is provided with a dent 320g. The dent 320g is a curved recess in this example, but may be a V-shaped recess with inclined surfaces instead.

The outer cover member 300x is provided with a stud-like member 380. The stud-like member 380 is composed of an advanceable/retractable member 381 having a stud 381a, a housing 382 which houses the advanceable/retractable member 381 reciprocably in advancing/retracting directions S, and a biasing member 383 (in this example, a general-purpose coil spring) which biases the advanceable/retractable member 381 in such a direction that the stud 381a projects from the outer cover member 300x.

A tip end of the stud 381a (a portion to be in contact with the dent 320g in the second transport guide member 320) is shaped like a curved bump, but may be shaped like a triangular bump instead.

The biasing member 383 is arranged between a back surface 381b of the advanceable/retractable member 381 opposite to the stud 381a and a bottom surface 382a of the housing 382 facing the back surface 381b of the advanceable/retractable member 381 opposite to the stud 381a. Specifically, an end of the biasing member 383 is anchored at a latch portion 381c (in this example, a latch hole) in the back surface 381b of the advanceable/retractable member 381, and the other end of the biasing member 383 is anchored at a latch portion 382b (in this example, a latch hole) in the bottom surface 382a of the housing 382.
——Fit Engagement Arrangement in FIG. 16——

In the arrangement shown in FIG. 16, the second transport guide member 320 is provided with a stud-like member 390 including a stud 391a. The stud-like member 390 is composed of an advanceable/retractable member 391 having the stud 391a, a housing 392 which houses the advanceable/retractable member 391 reciprocably in advancing/retracting directions S, and a biasing member 393 (in this example, a general-purpose coil spring) which biases the advanceable/retractable member 391 in such a direction that the stud 391a projects from the second transport guide member 320.

A tip end of the stud 391a (a portion to be in contact with the dent 300b in the outer cover member 300x) is shaped like a triangular bump, but may be shaped like a curved bump instead.

The biasing member 393 is fitted in between a back surface 391b of the advanceable/retractable member 391 opposite to the stud 391a and a bottom surface 392a of the housing 392 facing the back surface 391b of the advanceable/retractable member 391 opposite to the stud 391a. Specifically, an end of the biasing member 393 is anchored at a latch portion 391c (in this example, a latch hole) in the back surface 391b of the advanceable/retractable member 391, and the other end of the biasing member 393 is anchored at a latch portion 392b (in this example, a latch hole) in the bottom surface 392a of the housing 392.

The dent 300b in the outer cover member 300x in this example is a V-shaped recess with inclined surfaces, but may be a curved recess instead.

Alternatively, in the arrangement shown in FIG. 15, the outer cover member 300x may be provided with a dent, and the second transport guide member 320 may be provided with a stud-like member. In the arrangement shown in FIG. 16, the second transport guide member 320 may be provided with a dent, and the outer cover member 300x may be provided with a stud-like member.

The first transport guide member 310 (for example, the one in First Embodiment-5) may be further arranged just as the second transport guide member 320 exemplified in FIGS. 15 and 16. Namely, with the biasing member 340 removed, the first transport guide member 310 may be arranged to be latched (locked) (to be stopped) at its second position by fit engagement with the automatic document feeder main body 300a (specifically, the outer cover member 300x).

Additionally, when the second transport guide member 320 is opened, the second transport guide member 320 may be arranged to stop at its third position where the center of gravity M2 of the second transport guide member 320 is on an open side of the second transport guide member 320 (a side to which the second transport guide member 320 opens by its own weight) (on the left side in FIG. 11) relative to the imaginary vertical line γ2. Alternatively, when the second transport guide member 320 is opened, the second transport guide member 320 may be arranged to be limited by the first transport guide member 310 and to stop at the third position where the center of gravity M2 of the second transport guide member 320 is on an open side of the second transport guide member 320 relative to the imaginary vertical line γ2. For example, the second transport guide member 320 which makes a rotational movement in the open direction Q2 by its own weight may be prevented from making the rotational movement in the open direction Q2 when the second transport guide member 320 comes into fit engagement with the automatic document feeder main body 300a (specifically, the outer cover member 300x) or when the second transport guide member 320 reaches its third position and comes into contact with the first transport guide member 310 stopping at its second position.

First Embodiment-9

Regarding the second transport guide member 320, the degree of opening at its second position (the position shown in FIG. 10) and the degree of opening at its third position (the position shown in FIG. 11) are different by d1 (angular degree) (see FIG. 11). Similarly, the degree of opening at its second position and the degree of opening at its first position (the position shown in FIG. 4) are different by d2 (angular degree) (see FIG. 10). In First Embodiment-9, the difference d1 is greater than the difference d2.

First Embodiment-10

In First Embodiment-10, an opening d3 (clearance) (see FIG. 11) between the second transport guide member 320 at its third position (the position shown in FIG. 11) and the third transport guide member 350 is wider than an opening d4 (clearance) (see FIG. 11) between the second transport guide member 320 at its third position and the first transport guide member 310 in an open state.

Second Embodiment

Figure 17:
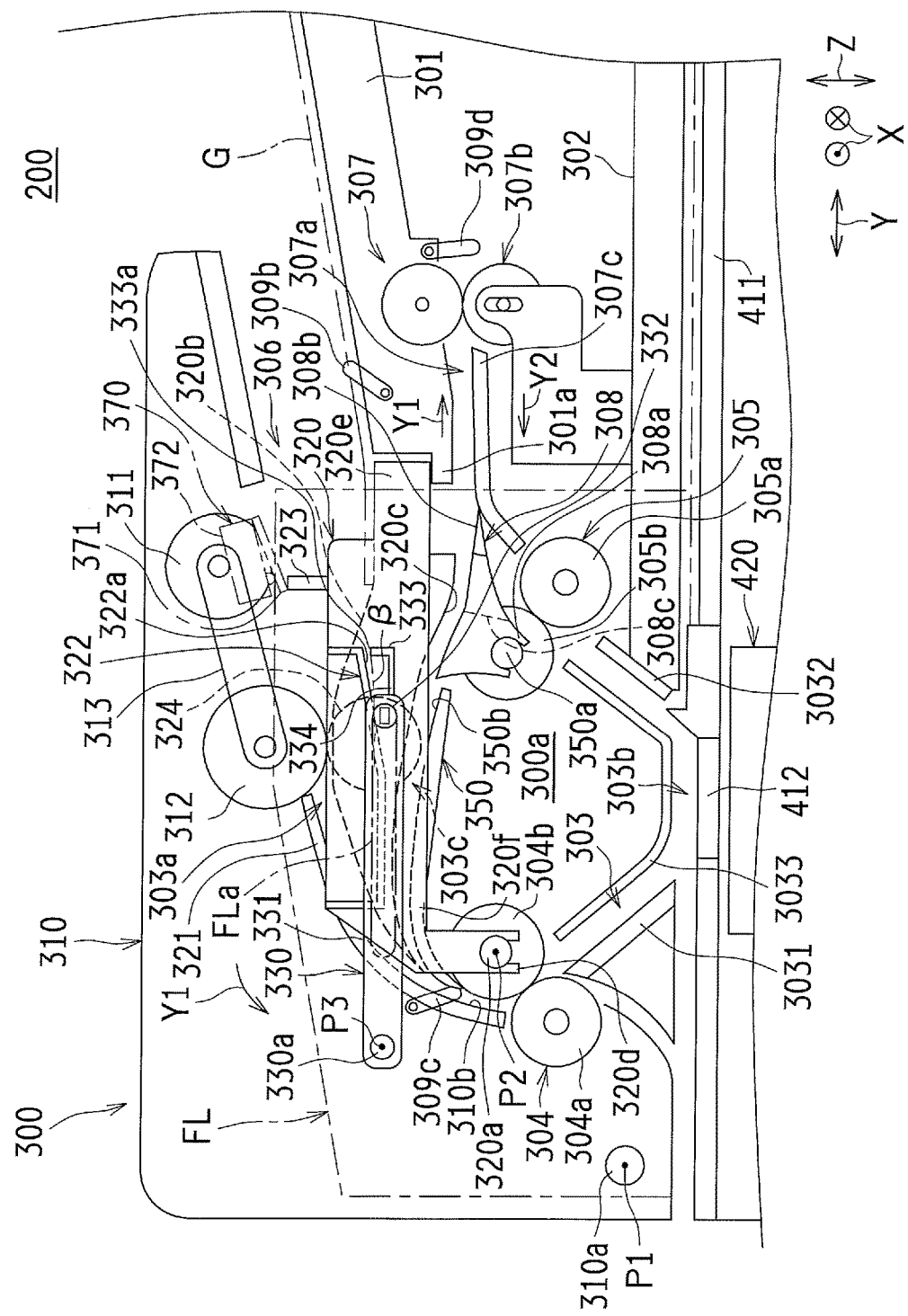
FIG. 17 is an enlarged schematic front view of another example of the sheet transport part in the automatic document feeder of the image reading apparatus shown in FIG. 2, with the first transport guide member closed and the second transport guide member at the first position.
Figure 18:
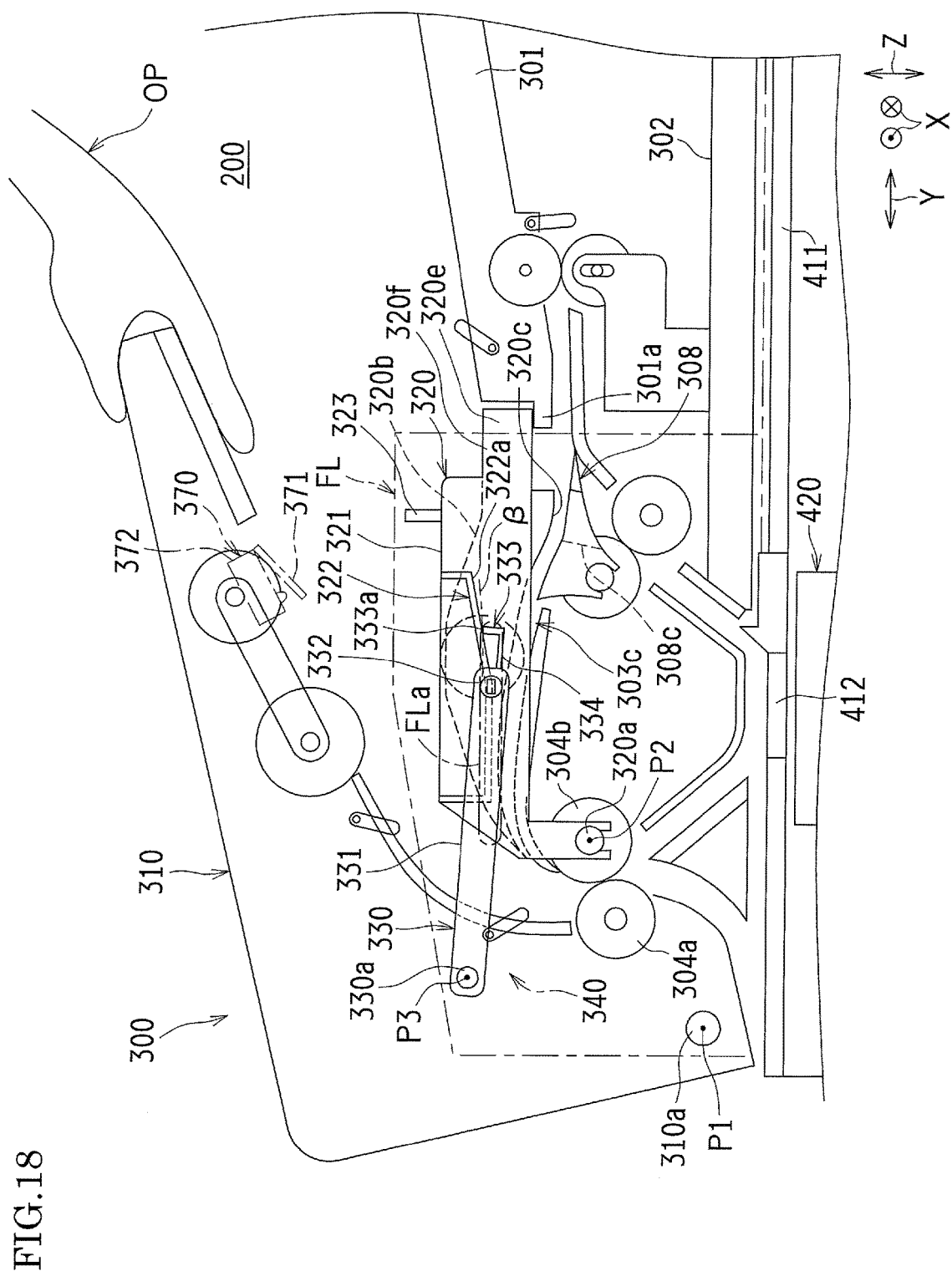
FIG. 18 is a schematic front view of the sheet transport part in the automatic document feeder shown in FIG. 17, with the first transport guide member in the process of opening or closing by an opening/closing operation by an operator, which causes the second transport guide member to move rotationally between the first position and the second position.
Figure 19:
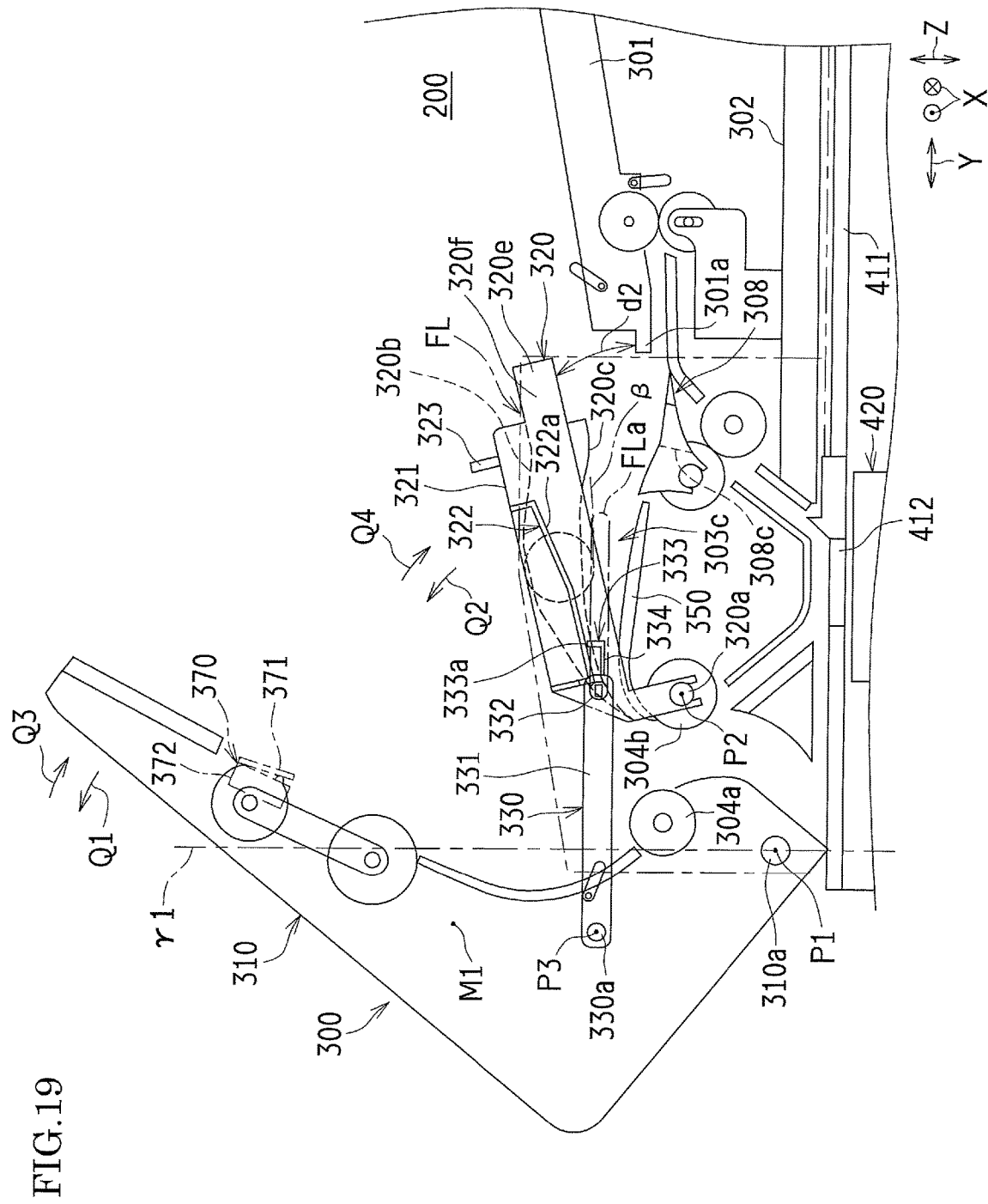
FIG. 19 is a schematic front view of the sheet transport part of the automatic document feeder shown in FIG. 17, with the first transport guide member fully open, which causes the second transport guide member to be at the second position.
Figure 20:
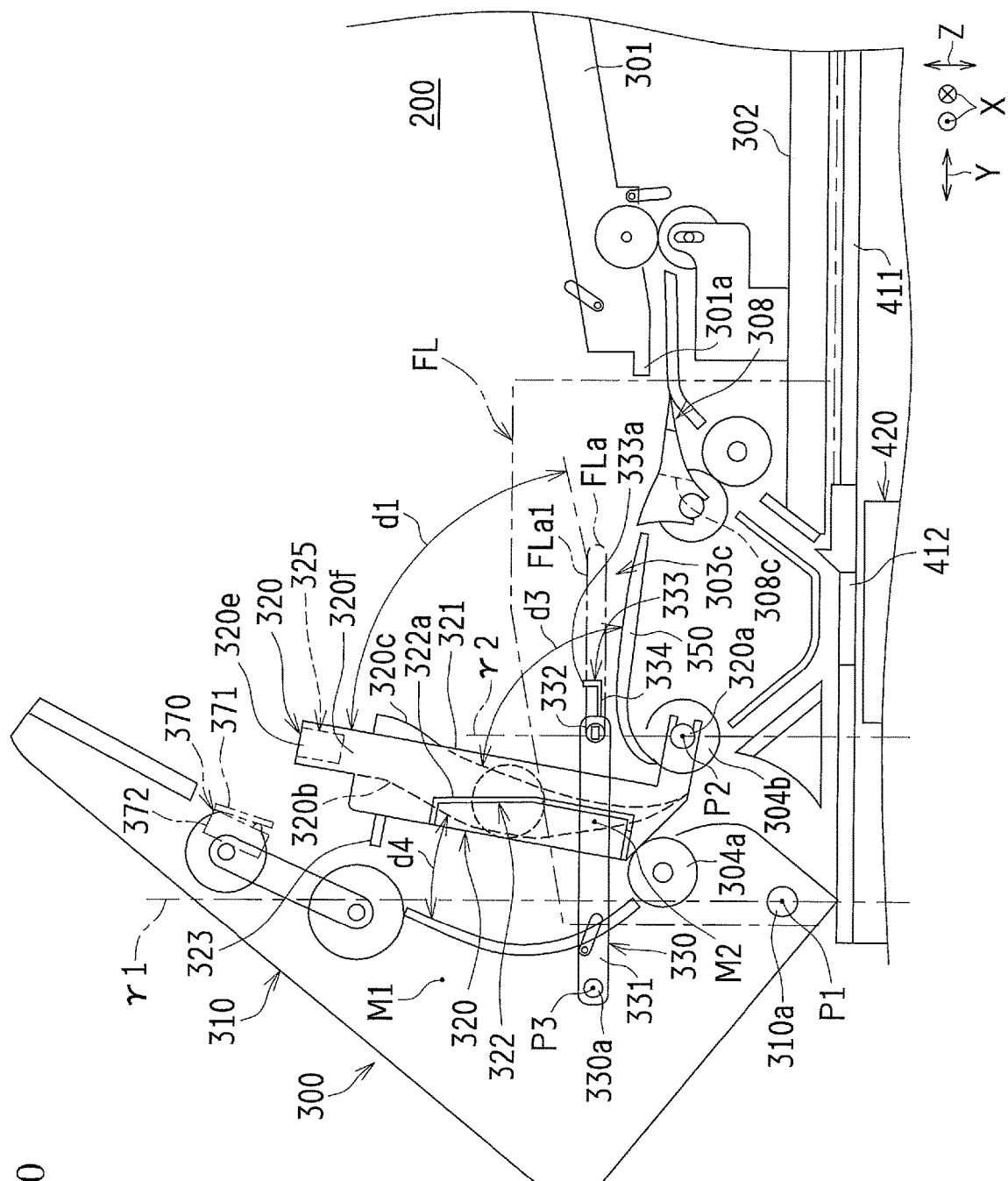
FIG. 20 is a schematic front view of the sheet transport part of the automatic document feeder shown in FIG. 17, with the first transport guide member fully open, wherein the second transport guide member is brought to a third position by an opening operation by an operator.

FIG. 17 is an enlarged schematic front view of another example of the sheet transport part in the automatic document feeder 300 of the image reading apparatus 200 shown in FIG. 4, with the first transport guide member 310 closed and the second transport guide member 320 at the first position. FIGS. 18-20 are schematic front views of the sheet transport part in the automatic document feeder 300 shown in FIG. 17. In FIG. 18, the first transport guide member 310 is in the process of opening or closing by an opening/closing operation by an operator OP, which causes the second transport guide member 320 to move rotationally between the first position and the second position. In FIG. 19, the first transport guide member 310 is fully open, which causes the second transport guide member 320 to be at the second position. In FIG. 20, the first transport guide member 310 is fully open, and the second transport guide member 320 is brought to the third position by an opening operation by an operator OP.

The automatic document feeder 300 shown in FIG. 17 is different from the automatic document feeder 300 shown in FIG. 4 in that the biasing member 340 and the latch portion FLb in the frame FL are removed, and that the elongated bore FLa1 in the guide part FLa of the frame FL is extended.

In the automatic document feeder 300 shown in FIG. 17, the description for the components and portions substantially identical to those mentioned in the automatic document feeder 300 shown in FIG. 4 is omitted by using the same reference numerals and symbols.

Second Embodiment-1

In Second Embodiment-1, when the first transport guide member 310 is opened (specifically, opened fully), the first transport guide member 310 is arranged to stop at its second position (see FIGS. 19 and 20). At the second position, the center of gravity M1 of the first transport guide member 310 (see FIGS. 19 and 20) is on an open side of the first transport guide member 310 (a side to which the first transport guide member 310 opens by its own weight) (on the left side in FIGS. 19 and 20) relative to an imaginary vertical line γ1 (see FIGS. 19 and 20) which passes through the first axis P1.

In this example, when the first transport guide member 310 moves rotationally in the open direction Q1 by its own weight and reaches its second position, the reciprocating part 332 of the swingable member 330 is latched in the guide part FLa of the frame FL. This action limits the rotational movement of the first transport guide member 310 in the open direction Q1, and causes the first transport guide member 310 to stop at the second position. For example, the first transport guide member 310 may be arranged just as the second transport guide member 320 exemplified in FIGS. 15 and 16. Namely, the first transport guide member 310 may be arranged to be latched (locked) (to be stopped) at its second position by fit engagement with the automatic document feeder main body 300a (specifically, the outer cover member 300x).

Second Embodiment-2

In Second Embodiment-2, the second transport guide member 320 is arranged to be brought to its second position (the position shown in FIG. 19) by the swingable member 330 which swings with the opening/closing movement of the first transport guide member 310.

Second Embodiment-3

In Second Embodiment-3, the second transport guide member 320 is arranged to be rotatably opened and closed at its second position (the position shown in FIG. 19). Namely, if a user opens and closes the second transport guide member 320 from the second position and lets go of the second transport guide member 320 at a downstream side in the open direction Q2 about the second axis P2, the second transport guide member 320 is arranged to rotate (fall) by its own weight.

Second Embodiment-4

In Second Embodiment-4, the second transport guide member 320 is arranged to stop at its third position (the position shown in FIG. 20). Namely, if the second transport guide member 320 is opened from the second position, the second transport guide member 320 is arranged to stop at a downstream side in the open direction Q2 about the second axis P2.

To be more specific, when the second transport guide member 320 is opened, the second transport guide member 320 is arranged to stop at its third position (the position shown in FIG. 20) where the center of gravity M2 of the second transport guide member 320 (see FIG. 20) is on an open side of the second transport guide member 320 (a side to which the second transport guide member 320 opens by its own weight) (on the left side in FIG. 20) relative to an imaginary vertical line γ2 (see FIG. 20) which passes through the second axis P2. Alternatively, when the second transport guide member 320 is opened, the second transport guide member 320 is arranged to be limited by the first transport guide member 310 and to stop at its third position where the center of gravity M2 of the second transport guide member 320 is on an open side of the second transport guide member 320 relative to the imaginary vertical line γ2. For example, the second transport guide member 320 which makes a rotational movement in the open direction Q2 by its own weight is arranged to be prevented from making the rotational movement in the open direction Q2 when the second transport guide member 320 comes into fit engagement (see FIGS. 15 and 16) with the automatic document feeder main body 300a (specifically, outer cover member 300x) or when the second transport guide member 320 reaches its third position and comes into contact with the first transport guide member 310 (in this example, the first registration roller 304a) stopping at its second position.

Additionally, when the second transport guide member 320 is opened, the second transport guide member 320 may be arranged to stop at its third position where the center of gravity M2 of the second transport guide member 320 is on a closed side of the second transport guide member 320 (a side to which the second transport guide member 320 closes by its own weight) (on the right side in FIG. 20) relative to the imaginary vertical line γ2 which passes through the second axis P2. For example, the second transport guide member 320 may be arranged to be latched (locked) (to be stopped) at its third position by fit engagement with the automatic document feeder main body 300a (specifically, an outer cover member 300x).

Second Embodiment-5

Regarding the second transport guide member 320, the degree of opening at its second position (the position shown in FIG. 19) and the degree of opening at its third position (the position shown in FIG. 20) are different by d1 (angular degree) (see FIG. 20). Similarly, the degree of opening at its second position and the degree of opening at its first position (the position shown in FIG. 17) are different by d2 (angular degree) (see FIG. 19). In Second Embodiment-5, the difference d1 is greater than the difference d2.

Second Embodiment-6

In Second Embodiment-6, an opening d3 (clearance) (see FIG. 20) between the second transport guide member 320 at its third position (the position shown in FIG. 20) and the third transport guide member 350 is wider than an opening d4 (clearance) (see FIG. 20) between the second transport guide member 320 at its third position and the first transport guide member 310 in an open state.

Third Embodiment

In Third Embodiment, the automatic document feeder 300 in any of First and Second Embodiments is provided with a recess 325 as shown in FIG. 12 (see also FIGS. 11, 20, and 22) at an end of the second transport guide member 320 (the upstream end 320e in the transport direction Y1) opposite to the swing fulcrum of the second transport guide member 320 (the second axis P2). The recess 325 in the second transport guide member 320 is provided on an operation side X1 (see FIG. 11) relative to the center in the width directions X. In this context, the operation side refers to a side where an operator OP operates the image reading apparatus 200 (the image forming apparatus 100).

To be more specific, the recess 325 is defined by an insertion part 325a having an upper opening 325x, and a grip 325b. The insertion part 325a is depressed downwardly in the second sheet guide surface 320b of the second transport guide member 320. The insertion part 325a is open to an upstream side in the transport direction Y1 and enables an operator OP to insert his/her fingers. In this insertion part 325a, the grip 325b covers a downstream side of the upper opening 325x in the transport direction Y1 and enables an operator OP to hold the grip 325b. In order to inform an operator OP of the presence of the grip 325b, an index 325c, such as a sticker in a predetermined color (green in this example), is attached on a top surface of the grip 325b.

Fourth Embodiment

In Fourth embodiment, the automatic document feeder 300 in any of First to Third Embodiments is further equipped with an interlock detection switch 370 (see FIGS. 4, 5, and 9-11) for prohibiting the action of the apparatus (the action of the automatic document feeder 300), and an activating part 323 (see FIGS. 4, 5, 7, and 9-12) for activating the interlock detection switch 370.

Figure 21:
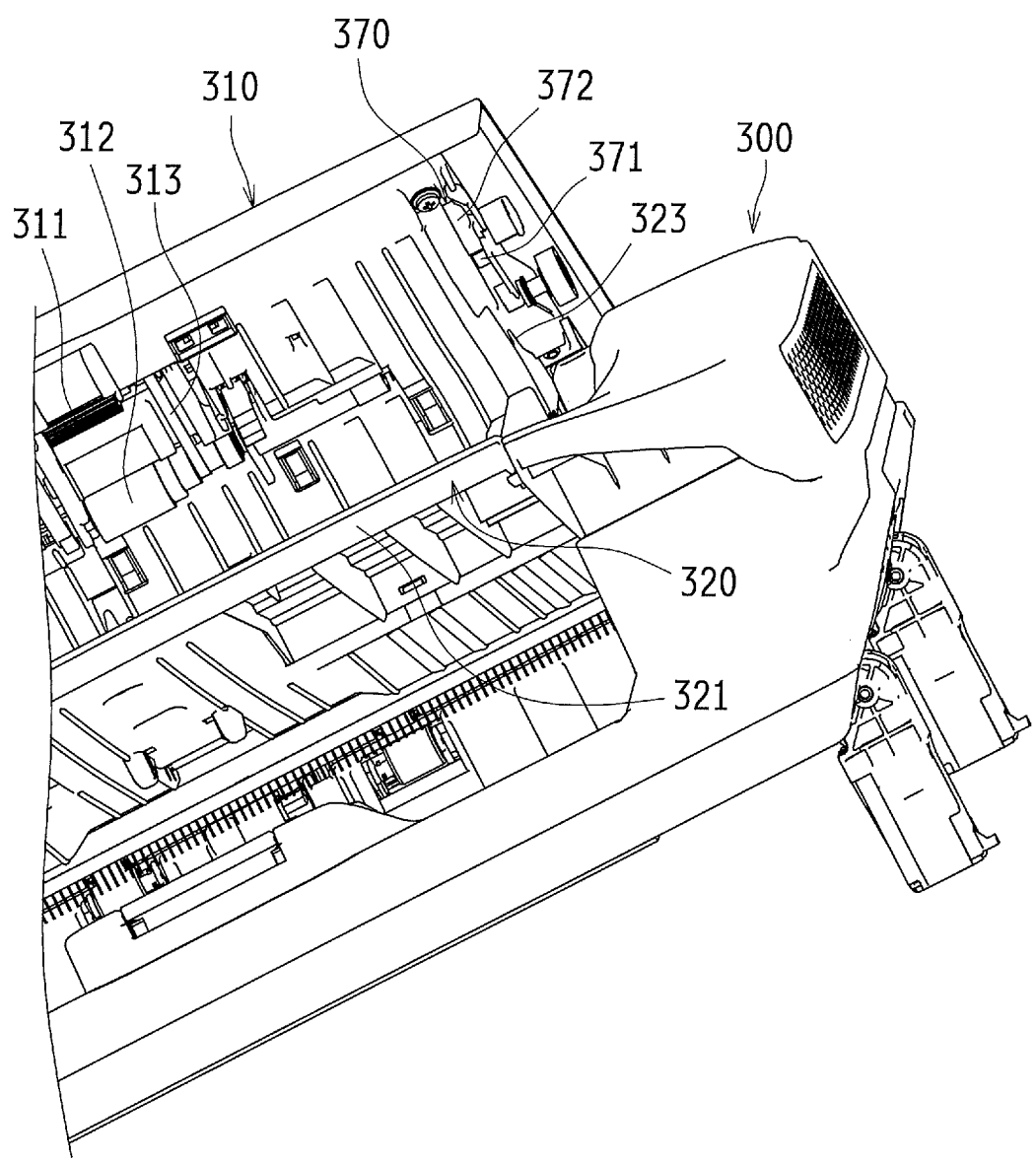
FIG. 21 is a side perspective view of an interlock detection switch and an activating part for explaining their operation, with the first transport guide member fully open and the second transport guide member in the process of opening or closing.
Figure 22:
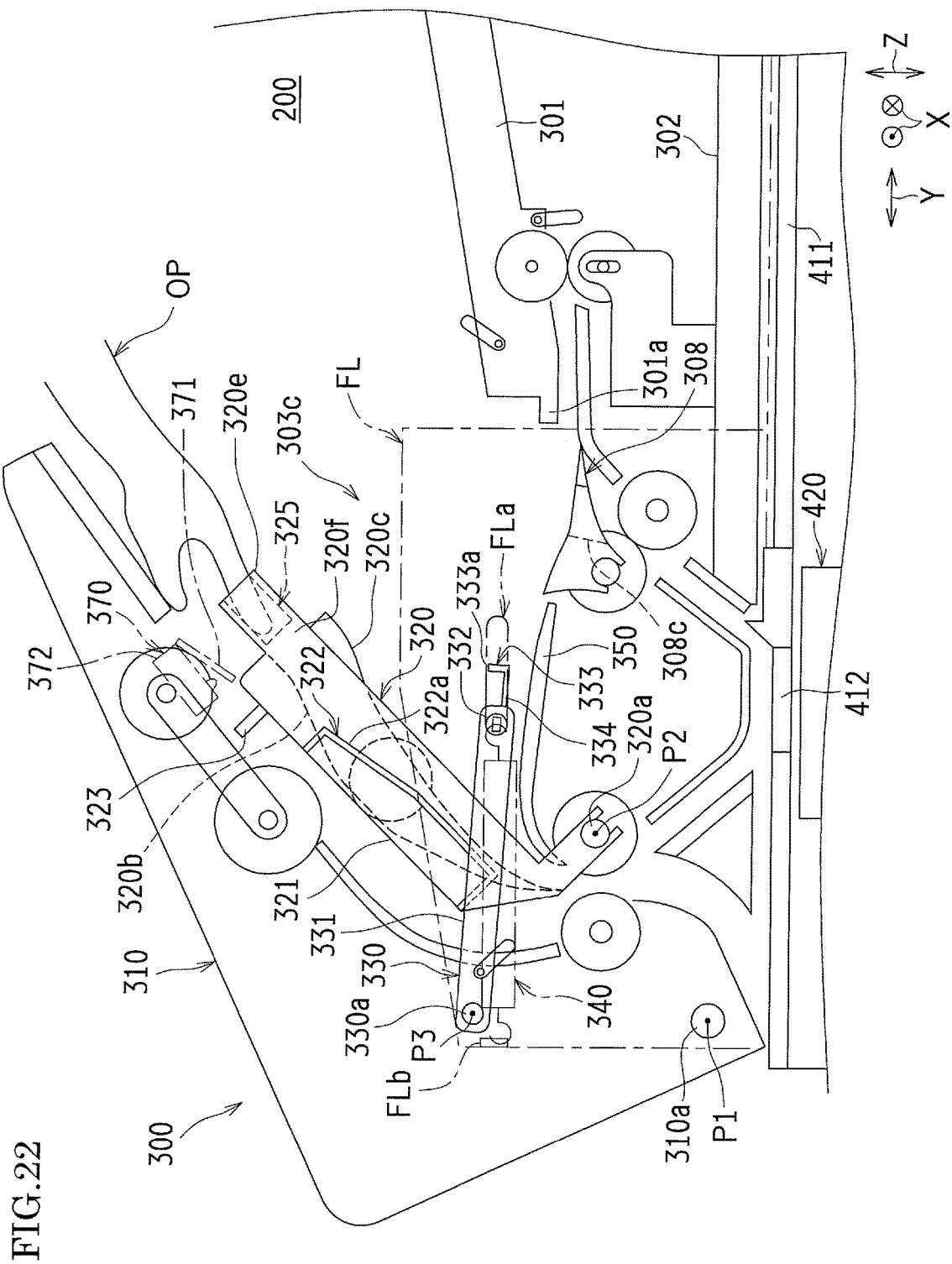
FIG. 22 is a schematic front view representing a positional relationship between the interlock detection switch and the activating part, for explaining their operation, with the first transport guide member and the second transport guide member fully open.

FIGS. 21 and 22 illustrate operations of the interlock detection switch 370 and the activating part 320. FIG. 21 is a side perspective view of the interlock detection switch 370 and the activating part 323, with the first transport guide member 310 fully open and the second transport guide member 320 in the process of opening or closing. FIG. 22 is a schematic front view which represents a positional relationship between the interlock detection switch 370 and the activating part 323, with the first transport guide member 310 and the second transport guide member 320 fully open. Incidentally, the arrangement according to Fourth Embodiment is applicable to both of the automatic document feeders 300 shown in FIG. 4 and in FIG. 17. Hence, FIG. 22 depicts an arrangement for the automatic document feeder 300 shown in FIG. 4 as a typical example, and illustration of an arrangement for the automatic document feeder 300 shown in FIG. 17 is omitted.

The interlock detection switch 370 is provided in either of the first transport guide member 310 or the second transport guide member 320 (in this example, the first transport guide member 310), and the activating part 323 is provided in the other transport guide member (in this example, the second transport guide member 320).

The interlock detection switch 370 and the activating part 323 are positioned such that, in the state where the first transport guide member 310 is closed (namely, in the state where the first transport guide member 310 and the second transport guide member 320 are both closed), the interlock detection switch 370 is turned on by the activating part 323 (namely, positioned to cancel the prohibition of the action of the apparatus, in other words, positioned to permit the action of the apparatus) (see FIGS. 4 and 5). In this example, the interlock detection switch 370 and the activating part 323 are disposed on the far side (specifically, the rear side) (see FIG. 21) in the width directions X of the automatic document feeder 300.

The first axis in the first transport guide member 310 (in this example, the first swing axis 310a) and the second axis P2 in the second transport guide member 320 (in this example, the second swing axis 320a) are provided at different positions from each other (see FIGS. 2, 4, 5, 8-11, and 22).

The interlock detection switch 370 is a switch (specifically, a microswitch) equipped with an actuator part 371 (see FIGS. 4, 5, 9-11, 21, and 22) which swings about an axis extending in the width directions X, and a switch part 372 (see FIGS. 4, 5, 9-11, 21, and 22) which keeps a deactivated state (a switch-off state) when no external force is applied to the actuator part 371, and which turns into an activated state (a switch-on state) by a swinging movement of the actuator part 371 when an external force is applied to the actuator part 371.

Specifically, the second transport guide member main body 321 and the activating part 323 are formed as a single piece to constitute the second transport guide member 320.

Fifth Embodiment

In Fifth Embodiment, the automatic document feeder 300 according to any of First to Fourth Embodiments is provided with through-windows 308c (FIGS. 4, 5, and 9-11) in the branching member 308, each of which penetrates from the second sheet transport path 303c side to the reverse sheet transport path 303b side.

FIG. 23 is a top, side perspective view of a part around the branching member 308, for explaining the through-windows 308c provided in the branching member 308, with the first transport guide member 310 fully open and the second transport guide member 320 removed. Incidentally, the arrangement according to Fifth Embodiment is applicable to both of the automatic document feeders 300 shown in FIG. 4 and in FIG. 17. Hence, FIG. 23 depicts an arrangement for the automatic document feeder 300 shown in FIG. 4 as a typical example, and illustration of an arrangement for the automatic document feeder 300 shown in FIG. 17 is omitted.

As shown in FIG. 23, a plurality of through-windows 308c-308c are arranged side by side in the width directions X.

(Paper Jam Clearing Operation by an Operator)

In the automatic document feeder 300, if a document G is jammed at the second transport guide member 320 on the far side of the first transport guide member 310 (in this example, in the second sheet transport path 303c or the reverse sheet transport path 303b), a paper jam clearing operation for removing the document G jammed at the second transport guide member 320 on the far side of the first transport guide member 310 (in this example, in the second sheet transport path 303c or the reverse sheet transport path 303b) is carried out in the following manner. For a start, an operator OP opens the first transport guide member 310 toward the first position (see FIG. 10) or the second position (see FIG. 19).

Specifically, when the lock mechanism 360 is unlocked by an operation by an operator OP for opening the first transport guide member 310 (see FIG. 9), the automatic document feeder 300 shown in FIG. 4 allows the first transport guide member 310 to be automatically opened (opened fully) in the open direction Q1 by a biasing force of the biasing member 340 in the open direction Q1, and to stop at the first position of the first transport guide member 310 (see FIG. 10). To be more specific, the first transport guide member 310 is retained so as not to make a rotational movement in the closing direction Q3 from the first position. In the automatic document feeder 300 shown in FIG. 17, when an operator OP opens (fully opens) the first transport guide member 310 in the open direction Q1, the first transport guide member 310 stops at its second position (in this example, the reciprocating part 332 is latched on the guide part FLa) (see FIG. 19). To be more specific, the first transport guide member 310 is limited so as not to make a rotational movement in the open direction Q1 from the second position.

At this time, the opening movement of the first transport guide member 310 in the open direction Q1 about the first swing axis 310a is followed by a swinging movement of the swingable member 330 about the third swing axis 330a, which in turn causes a swinging movement of the second transport guide member 320 in the open direction Q2 about the second swing axis 320a toward its second position.

To be more specific, the swingable member 330 swings about the third swing axis 330a relative to the first transport guide member 310, and the reciprocating part 332 moves in the crosswise directions Y (specifically, along the guide part FLa of the frame FL) toward one side in the crosswise directions Y (in this example, to the left in front view). Then, the sliding surface 333a of the abutting part 333 provided at the reciprocating part 332 (specifically, the abutting part 333 provided at the reciprocating part 332 by means of the supporting part 334) is caused to slide along the sliding contact guide part 322 of the second transport guide member 320. At this time, the abutting part 333 of the reciprocating part 332 which is moving to the one side in the crosswise directions Y lifts the second transport guide member 320 to the second position, by sliding along the sliding contact surface 322a which intersects with the locus of movement β

(see FIGS. 9 and 18). Specifically, the second transport guide member 320 is lifted toward its second position in the open direction Q2 about the second swing axis 320a (see FIGS. 10 and 19) to such an extent that an operator OP can recognize that the second transport guide member 320 can be opened and closed. As a result, an operator OP can recognize that the second transport guide member 320 can be opened and closed. Additionally or alternatively, an operator OP can visually recognize that a document G is jammed at the second transport guide member 320 on the far side of the first transport guide member 310 (in this example, in the second sheet transport path 303c or the reverse sheet transport path 303b).

Then, an operator OP opens the second transport guide member 320. In the automatic document feeder 300 shown in FIG. 4, the second transport guide member 320 is opened by an operator OP in the open direction Q2 and brought to its third position (for example, the second transport guide member 320 is caused to stop by fit engagement) (see FIG. 11). In the automatic document feeder 300 shown in FIG. 17, the second transport guide member 320 is opened by an operator OP in the open direction Q2 and brought to its third position (for example, the second transport guide member 320 abuts on the first transport guide member 310, and the first transport guide member 310 limits the rotational movement of the second transport guide member 320 in the open direction Q2 and causes the second transport guide member 320 to stop). In this manner, an operator OP can easily remove a document G jammed in the second sheet transport path 303c (see FIG. 5) or a document G jammed in the reverse sheet transport path 303b (specifically, a document G visible through the through-windows 308c in the branching member 308).

After this paper jam clearing operation, an operator OP closes the second transport guide member 320 toward the second position (see FIGS. 10 and 19) by an operation for closing the second transport guide member 320. Specifically, in response to an operation by an operator OP for closing the second transport guide member 320, the second transport guide member 320 moves in the closing direction Q4 to the second position, where the sliding contact guide part 322 of the second transport guide member 320 rests on the abutting part 333 of the swingable member 330 by its own weight (see FIGS. 10 and 19).

Next, an operator OP closes the first transport guide member 310 by an operation for closing the first transport guide member 310 (see FIGS. 4 and 17).

Specifically, in the automatic document feeder 300 shown in FIG. 4, the first transport guide member 310 is closed in the closing direction Q3 by an operation by an operator OP for closing the first transport guide member 310, against the biasing force of the biasing member 340 in the open direction Q1 (see FIG. 9), and the first transport guide member 310 is locked by the lock mechanism 360 (see FIG. 4). In the automatic document feeder 300 shown in FIG. 17, the first transport guide member 310 is closed in the closing direction Q3 by an operation by an operator OP for closing the first transport guide member 310 (see FIG. 18), and is locked by the lock mechanism 360 (see FIG. 17).

At this time, the closing movement of the first transport guide member 310 in the closing direction Q3 about the first swing axis 310a is followed by a swinging movement of the swingable member 330 about the third swing axis 330a, which in turn causes a swinging movement of the second transport guide member 320 in the closing direction Q4 about the second swing axis 320a toward its first position.

To be more specific, the swingable member 330 swings about the third swing axis 330a relative to the first transport guide member 310, and the reciprocating part 332 moves in the crosswise directions Y (specifically, along the guide part FLa of the frame FL) toward the other side in the crosswise directions Y (in this example, to the right in front view). Then, the sliding surface 333a of the abutting part 333 provided at the reciprocating part 332 (specifically, the abutting part 333 provided at the reciprocating part 332 by means of the supporting part 334) is caused to slide along the sliding contact guide part 322 of the second transport guide member 320. At this time, the abutting part 333 of the reciprocating part 332 which is moving to the other side in the crosswise directions Y causes the second transport guide member 320 to come down by its own weight, by sliding along the sliding contact surface 322a which intersects with the locus of movement β. Thereafter, the sliding surface 333a and the sliding contact guide part 322 lose contact with each other. The second transport guide member 320 at its first position allows the upstream end 320e to rest on the downstream end 301a of the document tray 301 by its own weight, and the first transport guide member 310 is closed.

Remarks on the Present Embodiments

In the automatic document feeder 300 described in any of the above embodiments, the second transport guide member 320 may be positioned at the first position when the first transport guide member 310 is closed, at the second position where the second transport guide member 320 opens from the first position when the first transport guide member 310 is opened, or at the third position where the second transport guide member 320 is opened from the second position. Hence, the second transport guide member 320 can be opened and closed freely relative to the first transport guide member 310. Eventually, the automatic document feeder 300 can facilitate the paper jam clearing operation for a document G and can enhance the work efficiency.

To be more specific, when the second transport guide member 320 is at the second position, opening from the first position, an operator can recognize that he/she can open and close the second transport guide member 320 and can grip the second transport guide member 320 easily, so that an operator can easily open the second transport guide member 320. Besides, when the second transport guide member 320 at the second position is opened or closed, with the first transport guide member 310 open, an operator OP can check without fail whether a document G is jammed at the second transport guide member 320 on the far side of the first transport guide member 310 (in this example, in the second sheet transport path 303c or the reverse sheet transport path 303b). In the case where a document G is jammed at the second transport guide member 320 on the near side of the first transport guide member 310 (in this example, in the first sheet transport path 303a), an operator OP can remove the document G jammed at the second transport guide member 320 on the near side of the first transport guide member 310, with the first transport guide member 310 being open. Further, in the case where a document G is jammed at the second transport guide member 320 on the far side of the first transport guide member 310 (in this example, in the second sheet transport path 303c or the reverse sheet transport path 303b), the second transport guide member 320 is opened from the second position to the third position, with the first transport guide member 310 being open. As a result, an operator OP can easily remove the document G jammed at the second transport guide member 320 on the far side of the first transport guide member 310.

In the automatic document feeder 300, the second transport guide member 320 is swingable about the second axis P2 (in this example, the second swing axis 320a). Hence, if a document G is jammed at the second transport guide member 320 on the far side of the first transport guide member 310, an operator OP can easily conduct a paper jam clearing operation for removing a document G jammed at the second transport guide member 320 on the far side of the first transport guide member 310. Moreover, since the swingable member 330 is swingable about the third axis P3 (in this example, the third swing axis 330a), relative to the first transport guide member 310, at a position different from the first axis of the first transport guide member 310 (in this example, the first swing axis 310a), an operator OP can open and close the second transport guide member 320 freely relative to the swingable member 330, and can thereby open and close the second transport guide member 320 freely relative to the first transport guide member 310. As a result, the automatic document feeder 300 can facilitate the paper jam clearing operation for a document G and can enhance the work efficiency.

Furthermore, in the automatic document feeder 300, when the first transport guide member 310 is opened or closed, the first transport guide member 310 moves in an opening/closing direction about the first axis (in this example, the first swing axis 310a), followed by a swinging movement of the swingable member 330 about the third axis P3 (in this example, the third swing axis 330a). In synchronization with the swinging movement of the swingable member 330, the second transport guide member 320 is caused to swing about the second axis P2 (in this example, the second swing axis 320a). Owing to this arrangement, an operator OP can recognize that the second transport guide member 320 can be opened and closed and can easily grip the second transport guide member 320 which has made a swinging movement. Eventually, an operator OP can open the second transport guide member 320 easily.

In the present embodiments, the second transport guide member 320 is brought to the second position by the swingable member 330 which swings with the opening/closing movement of the first transport guide member 310. Thus, the second transport guide member 320 can be brought to the second position by a simple arrangement.

The second transport guide member 320 and the swingable member 330 may be detachably connected by a connection member. However, use of a connection member tends to sacrifice the work efficiency in a paper jam clearing operation for a document G, complicates the structure of the apparatus, and increases the cost for components.

In this regard, the automatic document feeder 300 according to any of the present embodiments is arranged to prevent the first transport guide member 310 and the swingable member 330 from swinging in synchronization with the opening/closing movement of the second transport guide member 320 about the second swing axis 320a when the second transport guide member 320 is opened or closed. This arrangement allows the second transport guide member 320 to be opened and closed more freely relative to the first transport guide member 310 and the swingable member 330, thereby facilitating the paper jam clearing operation for a document G and enhancing the work efficiency. In addition, the automatic document feeder 300 does not require a connection member, thereby simplifying the structure of the apparatus and reducing the cost for components.

In the present embodiments, the swingable member 330 is provided with the reciprocating part 332 and the abutting part 333. The second transport guide member 320 is provided with the sliding contact guide part 322 which is arranged to make a sliding contact with the abutting part 333 of the swingable member 330 and to lift the second transport guide member 320 about the second axis P2 (in this example, the second swing axis 320a) when the reciprocating part 332 of the swingable member 330 moves. Hence, when the reciprocating part 332 of the swingable member 330 moves in response to the opening movement of the first transport guide member 310, the abutting part 333 makes a sliding movement along the sliding contact guide part 322, thereby lifting the second transport guide member 320 in the open direction Q2 about the second axis P2 (in this example, the second swing axis 320a).

As mentioned, the second transport guide member 320 is swingable about the second axis P2 (in this example, the second swing axis 320a). If an operator OP closes the second transport guide member 320 in an open state quite powerfully (namely, if the second transport guide member 320 is closed violently), the sliding contact guide part 322 hits the abutting part 333 so violently as to cause the abutting part 333 to be broken, to come off from the reciprocating part 332, or to be damaged otherwise. Such a trouble is particularly noticeable in the case where the first transport guide member 310 and the swingable member 330 are prevented from swinging in synchronization with the opening/closing movement of the second transport guide member 320 about the second swing axis 320a when the second transport guide member 320 is opened or closed.

In this regard, the swingable member 330 in the present embodiments is further provided with the supporting part 334, and the abutting part 333 is supported by the reciprocating part 332 by means of the supporting part 334. This arrangement can prevent the abutting part 333 from being broken, coming off from the reciprocating part 332, or being damaged otherwise. The supporting part 334, being flexible, can reduce an impact on the abutting part 333. This arrangement can further prevent the abutting part 333 from being broken, coming off from the reciprocating part 332, or being damaged otherwise. These arrangements are particularly effective in the case where the first transport guide member 310 and the swingable member 330 are prevented from swinging in synchronization with the opening/closing movement of the second transport guide member 320 about the second swing axis 320a when the second transport guide member 320 is opened or closed.

As mentioned, in the state where the first transport guide member 310 is open, the abutting part 333 of the swingable member 330 is caused to slide along the sliding contact guide part 322 so as to lift the second transport guide member 320. During this operation, if the second transport guide member 320 is lifted too much (opened too much), a trouble may occur when an operator attempts to close only the second transport guide member 320 forcibly. Namely, an excessive load is imposed on the sliding contact guide part 322 of the second transport guide member 320 and the abutting part 333 of the swingable member 330, and breaks the second transport guide member 320 and/or the swingable member 330.

In this regard, when the first transport guide member 310 is opened, the sliding contact guide part 322 in the present embodiments is arranged to lift the second transport guide member 320 by a predetermined degree in the open direction Q2 about the second axis P2 (in this example, the second swing axis 320a) to such an extent that an operator can recognize that the second transport guide member 320 can be opened and closed. In the state where the first transport guide member 310 is open, this arrangement can effectively prevent an operator OP from closing the second transport guide member 320, and hence can avoid an excessive load on the sliding contact guide part 322 of the second transport guide member 320 and the abutting part 333 of the swingable member 330. Eventually, the second transport guide member 320 and/or the swingable member 330 can be effectively protected from breakage.

Further in the present embodiments, the frame FL provided in the automatic document feeder main body 300a includes the guide part FLa for guiding the reciprocating part 332 of the swingable member 330 in the reciprocating directions (in this example, the crosswise directions Y). The reciprocating part 332 of the swingable member 330 is equipped with the engagement portion 332a to be engaged with the guide part FLa of the frame FL, so that the engagement portion 332a of the reciprocating part 332 can be guided in the guide part FLa of the frame FL without fail. Eventually, this arrangement ensures a stable reciprocating movement of the reciprocating part 332 of the swingable member 330 in association with the opening movement of the first transport guide member 310.

Further in the present embodiments, the biasing member 340 is disposed between the reciprocating part 332 of the swingable member 330 and the frame FL, and biases the first transport guide member 310 in the open direction Q1 about the first axis (in this example, the first swing axis 310a). By making use of the reciprocating mechanism of the reciprocating part 332 in the swingable member 330 associated with the opening movement of the first transport guide member 310, a biasing force of the biasing member 340 can be applied to the first transport guide member 310 in the open direction Q1 about the first axis (in this example, the first swing axis 310a). Eventually, the biasing force of the biasing member 340 can be applied to the first transport guide member 310 by a simple structure.

In the present embodiments, the biasing member 340 is a long, general-purpose coil spring. In the state where the first transport guide member 310 is closed, the biasing member 340 is oriented in the reciprocating directions (in this example, the crosswise directions Y) and arranged between the reciprocating part 332 and the frame FL. Hence, the first transport guide member 310 can be biased, by means of the swingable member 330, in the open direction Q1 about the first axis (in this example, the first swing axis 310a), without sacrificing the biasing capacity of the biasing member 340 when the reciprocating part 332 reciprocates in the reciprocating directions (in this example, the crosswise directions Y).

In the present embodiments, the second transport guide member 320 is arranged to stop at its third position, thereby preventing the second transport guide member 320 from making a rotational movement by its own weight during the paper jam clearing operation for a document G jammed at the second transport guide member 320 on the far side of the first transport guide member 310. With this arrangement, it is no longer necessary for an operator to keep gripping the second transport guide member 320 during the paper jam clearing operation, and an operator can easily remove a document G jammed at the second transport guide member 320 on the far side of the first transport guide member 310. This arrangement can further facilitate the paper jam clearing operation for a document G and can further enhance the work efficiency.

In the present embodiments, since the second transport guide member 320 is arranged to open and close rotatably at its second position, the second transport guide member 320 can be opened and closed at the second position by a simple structure.

Regarding the second transport guide member 320, the degree of opening at its second position and the degree of opening at its third position are different by d1 (angular degree). Similarly, the degree of opening at its second position and the degree of opening of its first position are different by d2 (angular degree). In the present embodiments, the difference d1 is greater than the difference d2. This arrangement facilitates removal of a document G jammed between the first transport guide member 310 and the second transport guide member 320, thereby further facilitating the paper jam clearing operation for a document G and enhancing the work efficiency.

In the present embodiments, an opening d3 between the second transport guide member 320 at its third position and the third transport guide member 350 is wider than an opening d4 between the second transport guide member 320 at its third position and the first transport guide member 310 in an open state. This arrangement facilitates removal of a document G jammed between the second transport guide member 320 and the third transport guide member 350, thus making it possible to facilitate the paper jam clearing operation for a document G and to enhance the work efficiency more advantageously.

In the present embodiments, when the second transport guide member 320 is opened, the second transport guide member 320 stops at its third position where the center of gravity M2 of the second transport guide member 320 is on a closed side of the second transport guide member 320 relative to an imaginary vertical line γ2 which passes through the second axis P2. During the paper jam clearing operation for a document G jammed at the second transport guide member 320 on the far side of the first transport guide member 310, this arrangement can prevent the second transport guide member 320 from moving rotationally in the closing direction by its own weight. With this arrangement, it is no longer necessary for an operator to keep gripping the second transport guide member 320 during the paper jam clearing operation, thus making it possible to facilitate the paper jam clearing operation for a document G jammed at the second transport guide member 320 on the far side of the first transport guide member 310 and to enhance the work efficiency more advantageously.

In the present embodiments, when the second transport guide member 320 is opened, the second transport guide member 320 is limited by the first transport guide member 310 and stops at its third position where the center of gravity M2 of the second transport guide member 320 is on an open side of the second transport guide member 320 relative to an imaginary vertical line γ2 which passes through the second axis P2. During the paper jam clearing operation for a document G jammed at the second transport guide member 320 on the far side of the first transport guide member 310, this arrangement can prevent the second transport guide member 320 from moving rotationally in the opening direction by its own weight. With this arrangement, it is no longer necessary for an operator to keep gripping the second transport guide member 320 during the paper jam clearing operation, thus making it possible to facilitate the paper jam clearing operation for a document G jammed at the second transport guide member 320 on the far side of the first transport guide member 310 and to enhance the work efficiency more advantageously. Besides, since the second transport guide member 320 stops at its third position by being limited by the first transport guide member 310, an additional member for stopping the second transport guide member 320 can be omitted. This arrangement further contributes to a simplified structure and low-cost production.

In the present embodiments, when the first transport guide member 310 is opened, the first transport guide member 310 stops at its first position where the center of gravity M1 of the first transport guide member 310 is on a closed side of the first transport guide member 310 relative to an imaginary vertical line γ1 which passes through the first axis P1. During the paper jam clearing operation for a document G jammed at the second transport guide member 320 on the near side of the first transport guide member 310, this arrangement can prevent the first transport guide member 310 from moving rotationally in the closing direction by its own weight. With this arrangement, it is no longer necessary for an operator no longer needs to keep gripping the first transport guide member 310 during the paper jam clearing operation, thus making it possible to facilitate the paper jam clearing operation for a document G jammed at the second transport guide member 320 on the near side of the first transport guide member 310 and to enhance the work efficiency more advantageously.

In the present embodiments, when the first transport guide member 310 is opened, the first transport guide member 310 stops at its second position where the center of gravity M1 of the first transport guide member 310 is on an open side of the first transport guide member 310 relative to an imaginary vertical line γ1 which passes through the first axis P1. During the paper jam clearing operation for a document G jammed at the second transport guide member 320 on the near side of the first transport guide member 310, this arrangement can prevent the first transport guide member 310 from moving rotationally in the opening direction by its own weight. With this arrangement, it is no longer necessary for an operator to keep gripping the first transport guide member 310 during the paper jam clearing operation, thus making it possible to facilitate the paper jam clearing operation for a document G jammed at the second transport guide member 320 on the near side of the first transport guide member 310 and to enhance the work efficiency more advantageously.

In the present embodiments, the recess 325 is provided at an end of the second transport guide member 320 (the upstream end 320e in the transport direction Y1) opposite to the swing fulcrum of the second transport guide member 320 (the second axis P2). Hence, an operator OP can insert his/her fingers in the recess 325 of the second transport guide member 320, and can thereby easily open the second transport guide member 320.

In the present embodiments, the recess 325 in the second transport guide member 320 is positioned closer to an operation side X1 relative to the center in the width directions X. This arrangement improves operability in the opening operation of the second transport guide member 320 by an operator OP.

In the present embodiments, the automatic document feeder 300 is equipped with the interlock detection switch 370 and the activating part 323. The interlock detection switch 370 is provided in either of the first transport guide member 310 or the second transport guide member 320 (in this example, the first transport guide member 310), and the activating part 323 is provided in the other transport guide member (in this example, the second transport guide member 320). The interlock detection switch 370 and the activating part 323 are positioned such that, in the state where the first transport guide member 310 is closed, the interlock detection switch 370 is turned on by the activating part 323.

Incidentally, the interlock detection switch 370 should be turned off when the first transport guide member 310 and the second transport guide member 320 are both open. However, if the first axis of the first transport guide member 310 (in this example, the first swing axis 310a) and the second axis P2 of the second transport guide member 320 (in this example, the second swing axis 320a) are disposed at the same position or a substantially same position, when the second transport guide member 320 is opened after the first transport guide member 310 is opened, the activating part 323 turns on the interlock detection switch 370, which cancels the prohibition of the action of the apparatus (in other words, permits the action of the apparatus). This unintended action deteriorates the safety in the state where the first transport guide member 310 and the second transport guide member 320 are both open.

In this regard, the first axis of the first transport guide member 310 (in this example, the first swing axis 310a) and the second axis P2 of the second transport guide member 320 (in this example, the second swing axis 320a) are disposed at different positions from each other in the present embodiments. Even when the second transport guide member 320 is opened after the first transport guide member 310 is opened, the interlock detection switch 370 and the activating part 323 can be positioned as shown in FIG. 22 such that the interlock detection switch 370 is not turned on by the activating part 323, with the first transport guide member 310 and the second transport guide member 320 being both open. This arrangement can prevent the interlock detection switch 370 from being turned on by the activating part 323 in an unintended situation. Eventually, while the first transport guide member 310 and the second transport guide member 320 are both open, it is possible to keep prohibiting the action of the apparatus, and thereby to effectively prevent deterioration in the safety in the state where the first transport guide member 310 and the second transport guide member 320 are both open.

In the present embodiments, the second transport guide member 320 is arranged on the rotation axis of a roller for transporting a document G. Hence, the rotation axis of an existing roller can be utilized as a swing axis serving as the second axis P2 of the second transport guide member 320. There is no need for an additional swing axis to serve as the second axis P2 of the second transport guide member 320, and the apparatus can be obtained in a reduced size at a reduced cost. Besides, the second transport guide member 320 is detachably arranged on the rotation axis of a roller for transporting a document G, which enhances the efficiency in maintenance work.

Regarding the pair of registration rollers 304a, 304b in the present embodiments, the first registration roller 304a is provided in the first transport guide member 310, and the second registration roller 304b is provided in the automatic document feeder main body 300a. The second transport guide member 320 is swingable about the axis of rotation of the second registration roller 304b (the second swing axis 320a). Hence, the rotation axis of an existing roller can be utilized as a swing axis serving as the second axis P2 of the second transport guide member 320, and the automatic document feeder 300 can be obtained in a reduced size at a reduced cost.

The sheet transport guide section 306 in the present embodiments is arranged to reverse a document G from one side to the other. Even if a reversed document G is jammed at the second transport guide member 320 on the far side of the first transport guide member 310, this arrangement facilitates the paper jam clearing operation for a document G at the second transport guide member 320 on the far side of the first transport guide member 310.

The automatic document feeder 300 in the present embodiments includes the reverse sheet transport path 303b, the discharge transport part 307, and the third transport guide member 350. The third transport guide member 350 constitutes the second sheet transport path 303c between the third transport guide member 350 and the second transport guide member 320, and the second sheet transport path 303c allows passage of the document G which is transported backward at the discharge transport part 307. In this arrangement, a document G fed from the first sheet transport path 303a into the reverse sheet transport path 303b is reversed from one side to the other in the reverse sheet transport path 303b, and is transported backward at the discharge transport part 307 during the process of discharge. Even if the reversed document G is jammed in the second sheet transport path 303c, this arrangement facilitates the paper jam clearing operation for a document G at the third transport guide member 350.

In the present embodiments, the branching member 308 is provided with through-windows 308c, each of which penetrates from the second sheet transport path 303c side to the reverse sheet transport path 303b side. The through-windows 308c allows an operator OP to see the state of a document G in the reverse sheet transport path 303b. Thus, an operator OP can check the state of the document G, including the presence or absence of the document G, in the reverse sheet transport path 303b.

In the present embodiments, the plurality of through-windows 308c-308c are arranged side by side in the width directions X. These through-windows 308c allow an operator OP to check a document G jammed in the reverse sheet transport path 303b, entirely across the width directions X.

Other Embodiments

The sheet transport apparatus according to the present embodiments is applied to the automatic document feeder 300, but should not be limited thereto. For example, the sheet transport apparatus according to the present embodiments may also be applied to the image forming apparatus main body 110 and may transport a recording sheet P as a sheet.

The present invention should not be limited to the embodiments described above, but may also be implemented in other various manners. Therefore, the above-described embodiments are considered in all respects as illustrative and not restrictive. The scope of the invention is indicated by the appended claims rather than the foregoing description. All variations and modifications falling within the equivalency range of the appended claims are intended to be embraced therein.

What is claimed is:

1. A sheet transport apparatus equipped with a sheet transport guide section for guiding a sheet to be transported, the sheet transport guide section comprising:
    a first transport guide member which is rotatable about a first axis extending in a width direction of the sheet, the width direction being orthogonal or substantially orthogonal to a sheet transport direction; and
    a second transport guide member which is rotatable about a second axis extending in the width direction and which forms a sheet transport path for allowing passage of the sheet between the second transport guide member and the first transport guide member,
    wherein the second transport guide member is arranged at a first position when the first transport guide member is closed, and at a second position when, as a result of opening of the first transport guide member, the second transport guide member is opened from the first position and stopped, and
    wherein a rotation angle when the second transport guide member rotates from the first position to the second position is smaller than a rotation angle when the first transport guide member rotates from a closed position to a position at which the opening of the first transport guide member is stopped.

2. The sheet transport apparatus according to claim 1, wherein the second transport guide member is further arranged at a third position when the second transport guide member is opened from the second position, and wherein the second transport guide member stops at the third position.

3. The sheet transport apparatus according to claim 2, wherein a rotation angle when the second transport guide member rotates from the second position to the third position is greater than the rotation angle when the second transport guide member rotates from the first position to the second position.

4. The sheet transport apparatus according to claim 2, wherein a rotation direction in which the second transport guide member rotates from the first position to the second position is the same as a rotation direction in which the second transport guide member rotates from the second position to the third position.

5. The sheet transport apparatus according to claim 2, further comprising a third transport guide member for guiding the sheet to be transported between the third transport guide member and the second transport guide member,
    wherein an opening between the second transport guide member at the third position and the third transport guide member is greater than an opening between the second transport guide member at the third position and the first transport guide member.

6. The sheet transport apparatus according to claim 2, wherein, when a second transport guide unit including at least the second transport guide member is opened, the second transport guide unit stops at the third position where a center of gravity of the second transport guide unit is on a closed side of the second transport guide unit relative to an imaginary vertical line which passes through the second axis about which the second transport guide member rotates.

7. The sheet transport apparatus according to claim 2, wherein, when a second transport guide unit including at least the second transport guide member is opened, the second transport guide unit is limited by a first transport guide unit including at least the first transport guide member and stops at the third position where a center of gravity of the second transport guide unit is on an open side of the second transport guide unit relative to an imaginary vertical line which passes through the second axis about which the second transport guide member rotates.

8. The sheet transport apparatus according to claim 1, wherein a rotation direction in which the first transport guide member is opened is the same as a rotation direction in which the second transport guide member is opened.

9. The sheet transport apparatus according to claim 1, wherein the second transport guide member includes a separation member configured to separate a transported sheet from another sheet.

10. The sheet transport apparatus according to claim 1, wherein, when a first transport guide unit including at least the first transport guide member is opened, the first transport guide unit stops at a first position thereof where a center of gravity of the first transport guide unit is on a closed side of the first transport guide unit relative to an imaginary vertical line which passes through the first axis about which the first transport guide member rotates.

11. The sheet transport apparatus according to claim 1, wherein, when a first transport guide unit including at least the first transport guide member is opened, the first transport guide unit stops at a second position thereof where a center of gravity of the first transport guide unit is on an open side of the first transport guide unit relative to an imaginary vertical line which passes through the first axis about which the first transport guide member rotates.

12. The sheet transport apparatus according to claim 1, wherein a recess is provided at an end of the second transport guide member opposite to a rotation fulcrum of the second transport guide member.

13. The sheet transport apparatus according to claim 1, further comprising an interlock detection switch for prohibiting an action of the apparatus, and an activating part for activating the interlock detection switch, wherein the interlock detection switch is provided in either of the first transport guide member or the second transport guide member, and the activating part is provided in the other transport guide member, and wherein the interlock detection switch and the activating part are positioned such that, in a state where the first transport guide member is closed, the interlock detection switch is turned on by the activating part.

14. An image forming apparatus comprising the sheet transport apparatus according to claim 1.

* * * * *